United States Patent
Hara

(10) Patent No.: US 10,567,577 B2
(45) Date of Patent: Feb. 18, 2020

(54) INFORMATION PROCESSING SYSTEM AND INFORMATION PROCESSING METHOD

(71) Applicant: KYOCERA Document Solutions Inc., Osaka (JP)

(72) Inventor: Hiroyuki Hara, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/338,453

(22) PCT Filed: Jul. 2, 2018

(86) PCT No.: PCT/JP2018/024987
§ 371 (c)(1),
(2) Date: Mar. 29, 2019

(87) PCT Pub. No.: WO2019/044156
PCT Pub. Date: Mar. 7, 2019

(65) Prior Publication Data
US 2019/0230219 A1    Jul. 25, 2019

(30) Foreign Application Priority Data

Aug. 31, 2017 (JP) .................................. 2017-167103
Aug. 31, 2017 (JP) .................................. 2017-167142

(51) Int. Cl.
*H04M 1/00* (2006.01)
*H04M 3/42* (2006.01)
(Continued)

(52) U.S. Cl.
CPC ...... *H04M 3/42221* (2013.01); *G06F 3/0481* (2013.01); *G06F 3/0488* (2013.01);
(Continued)

(58) Field of Classification Search
CPC .......... H04M 1/72519; H04M 1/0214; H04M 1/72583; H04M 1/72561; H04M 1/72547; H04M 1/72522; H04M 1/72527
(Continued)

(56) References Cited

U.S. PATENT DOCUMENTS

| | | | | |
|---|---|---|---|---|
| 2013/0309646 A1* | 11/2013 | Asano | ....................... | G09B 7/00 434/350 |
| 2014/0250406 A1* | 9/2014 | Seo | ........................ | G06F 3/0488 715/781 |
| 2015/0304717 A1* | 10/2015 | Kim | .................... | G06Q 30/0269 725/59 |

FOREIGN PATENT DOCUMENTS

| | | |
|---|---|---|
| JP | 2012-212194 A | 11/2012 |
| JP | 2013-114334 A | 6/2013 |

(Continued)

OTHER PUBLICATIONS

Terada, Ryou, Yonezawa, Nobuyoshi. Development of Notebook with Bidirectional Link between Arbitrary Duration of Timeline and Point on Sheets. IEICE Technical Report, Mar. 22, 2013, vol. 112, No. 500, pp. 173-178.

(Continued)

*Primary Examiner* — Temica M Beamer
(74) *Attorney, Agent, or Firm* — Hawaii Patent Services; Nathaniel K. Fedde; Kenton N. Fedde

(57) ABSTRACT

Provided is an information processing system that, by reproducing writing in a notebook together with the situation in which the writing is written in the notebook, makes it possible to easily understand the contents of writing in a notebook. To achieve this, a mobile terminal: receives writing on a page of a notebook displayed on a touch panel; together with receiving writing, executes at least one or more application; respectively adds time stamps to the received writing data and the execution contents of each of the executed applications; as playback data of a written page, transmits a recording request to a data management apparatus; then, when displaying a written page on the touch panel; receives playback data from the data management apparatus; and based on time stamps, synchronously plays back writing data and the execution contents included in the received playback data.

15 Claims, 20 Drawing Sheets

(51) Int. Cl.
*G06F 3/06* (2006.01)
*G06F 3/16* (2006.01)
*G06F 3/0488* (2013.01)
*H04L 29/08* (2006.01)
*G11B 27/10* (2006.01)
*G09B 5/02* (2006.01)
*G06F 3/0481* (2013.01)
*G06F 13/00* (2006.01)
*H04W 12/00* (2009.01)
*G06F 21/32* (2013.01)

(52) U.S. Cl.
CPC .......... *G06F 3/0604* (2013.01); *G06F 3/0659* (2013.01); *G06F 3/0673* (2013.01); *G06F 3/167* (2013.01); *G06F 13/00* (2013.01); *G09B 5/02* (2013.01); *G11B 27/10* (2013.01); *H04L 67/22* (2013.01); *G06F 21/32* (2013.01); *H04W 12/002* (2019.01)

(58) Field of Classification Search
USPC ...................................... 455/566, 556.2, 563
See application file for complete search history.

(56) References Cited

FOREIGN PATENT DOCUMENTS

| | | |
|---|---|---|
| JP | 2013-223086 A | 10/2013 |
| JP | 2014-164603 A | 9/2014 |
| JP | 2016-053728 A | 4/2016 |

OTHER PUBLICATIONS

Konno, Shotaro et al. Trials of a system for Recording and Browsing of Notices during a lesson by Lesson Observers in Teaching Practice. IPSJ Interaction 2015. Feb. 26, 2015, pp. 594-597.

* cited by examiner

```
JSON.stringify({
startTime:xxxx.yy.dd.hh.mm,ss,
endTime:xxxx.yy.dd.hh.mm,ss,
recordingTime:hh.mm.dd.
fileName:aaaa.wav
})
```
61, 62, 63

```
JSON.stringify({
startTime:xxxx.yy.dd.hh.mm,ss,
endTime:xxxx.yy.dd.hh.mm,ss,
recordingTime:hh.mm.dd.
fileName:aaaa.SVG
})
```
64

```
JSON.stringify({
startTime:xxxx.yy.dd.hh.mm,ss,
endTime:xxxx.yy.dd.hh.mm,ss,
recordingTime:hh.mm.dd.
text:{
   fonttype:Gothic,
   siza:40px,
   string:"abcd",
   x:100,
   y:300
}
image:{
   fileName:image.jpg,
   x:200,
   y:400
}
link:{
   fonttype:Gothic,
   siza:40px,
   string:"abcd",
   x:100,
   y:300
   href:http://www.abcd
}
})
```
65

```
JSON.stringify({
startTime:xxxx.yy.dd.hh.mm,ss,
endTime:xxxx.yy.dd.hh.mm,ss,
recordingTime:hh.mm.dd.
})
```
66

```
JSON.stringify({
startTime:xxxx.yy.dd.hh.mm,ss,
endTime:xxxx.yy.dd.hh.mm,ss,
recordingTime:hh.mm.dd,
appID:bbbb
eventID:cccc
inputdata:dddd
})
```
67

FIG.8

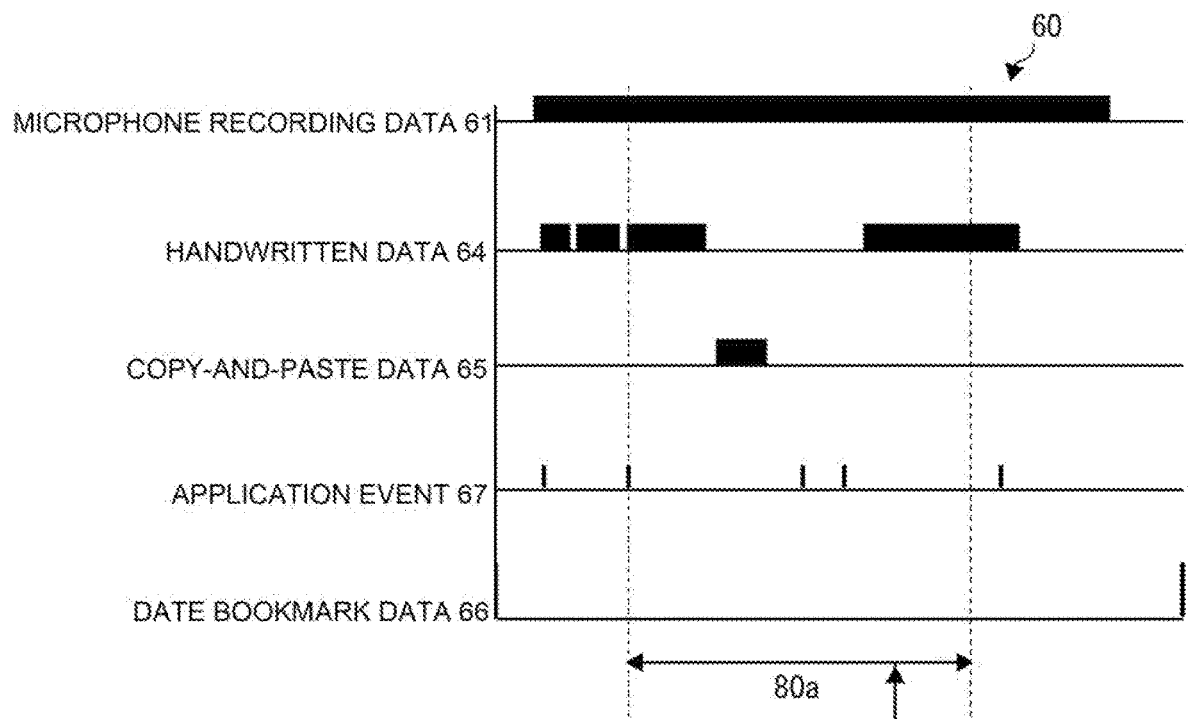
FIG.14
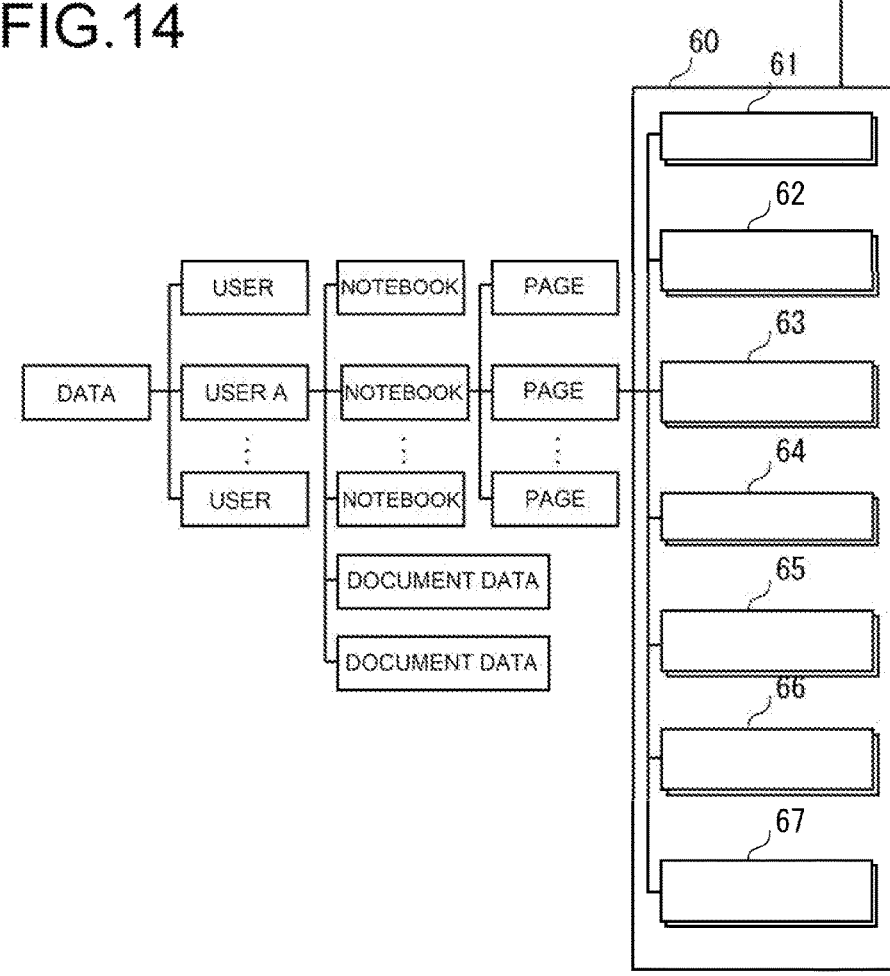

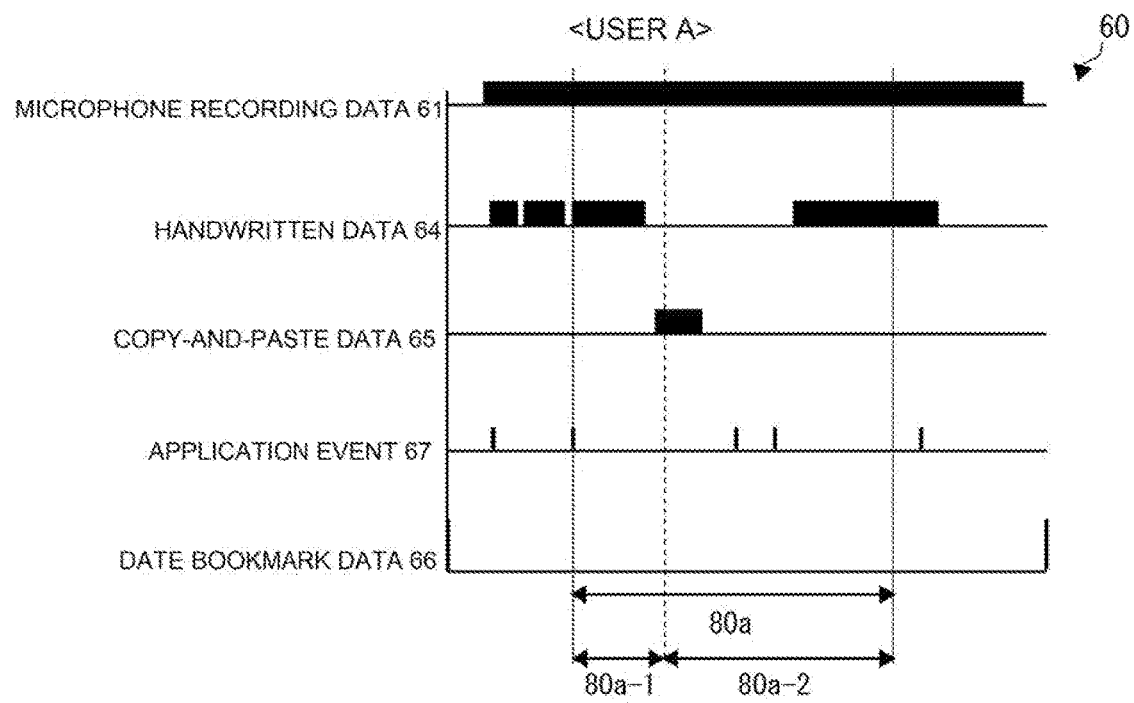
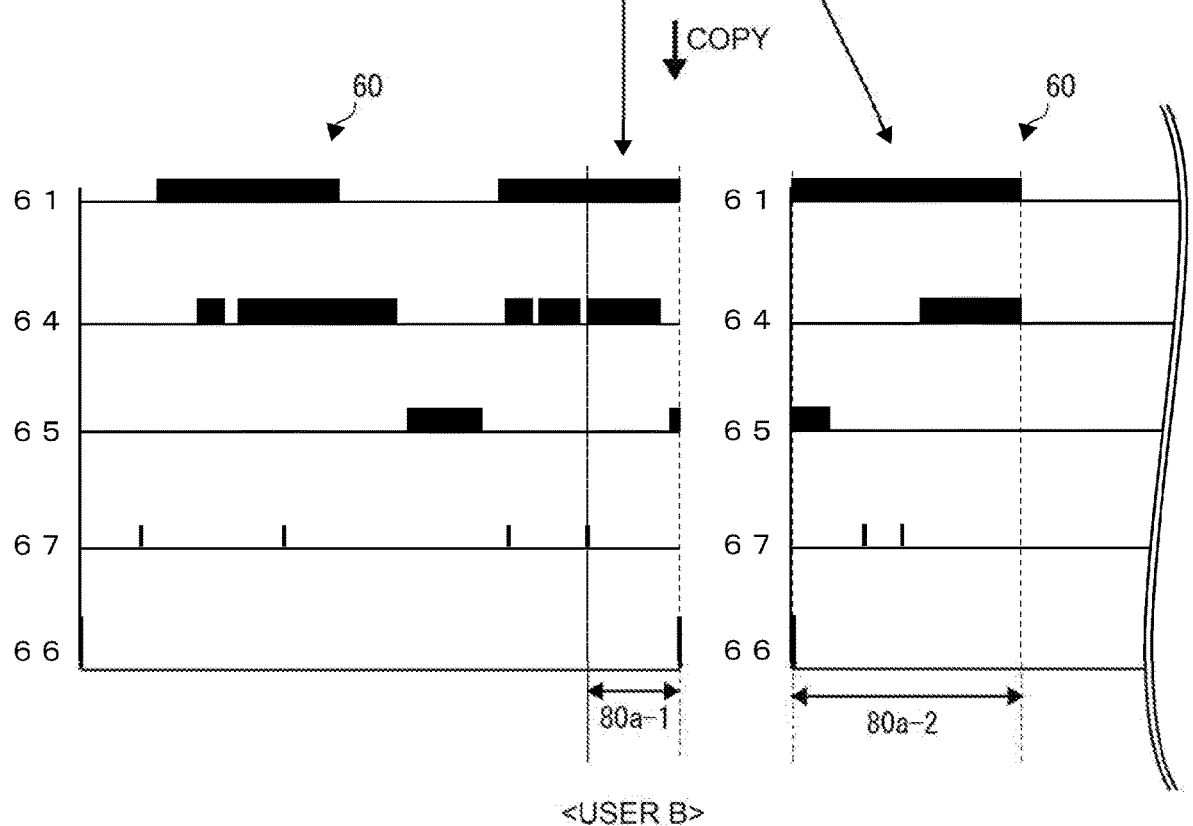
FIG.17

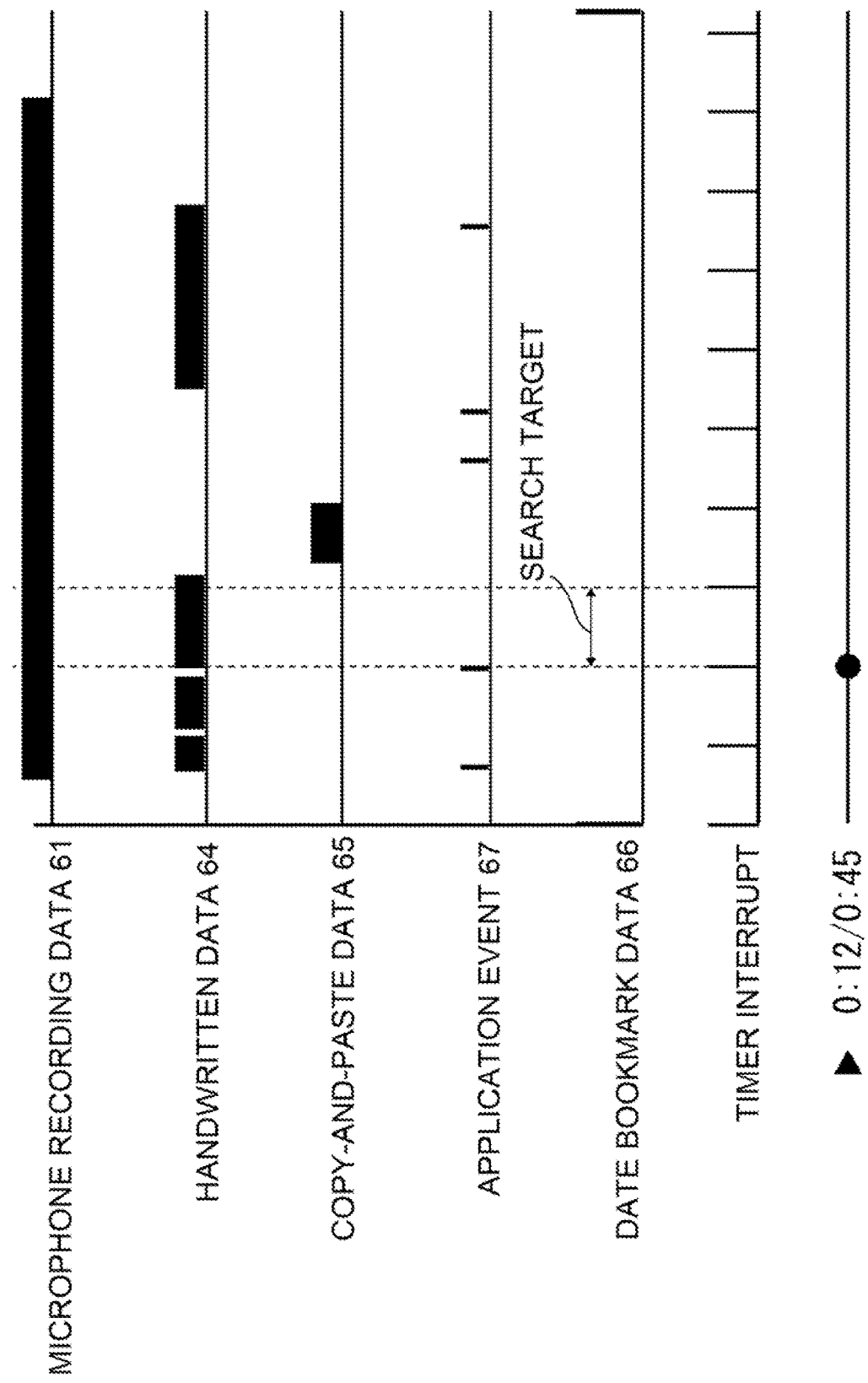

INFORMATION PROCESSING SYSTEM AND INFORMATION PROCESSING METHOD

TECHNICAL FIELD

The present invention relates to an information processing system and an information processing method including mobile terminals and a data management apparatus connected to the mobile terminals via a network.

BACKGROUND ART

In recent years, classroom digitization has been advancing. For example, techniques have been proposed that records information of recording the voice of an instructor and capturing content to be displayed on classroom monitors as recorded information, and, at the timing when a page number of the content changes, synchronization information for the content and recorded information is created and recorded (for example, refer to Patent Literature 1). In the technique of Patent Literature 1, via a network, content and recorded information can be reproduced in synchronization with each other at a timing when the page number of the content changes.

CITATION LIST

Patent Literature

Patent Literature 1: JP 2013-223086 A

SUMMARY OF INVENTION

Technical Problem

However, with a conventional technique, even in the case where a student takes notes in a notebook during the lesson, the content written in the notebook is not correlated and recorded with recorded information or the like. Therefore, even in the case where a student reviews notes while reproducing the recorded information together with the content, there is a problem in that the student is not able to understand the written content of the note, because it is not known what was written in the note and what the note is based on.

In consideration of the problem described above, an object of the present invention to provide a technique that, by making it possible to reproduce writing in a notebook together with the situation in which the writing in the notebook is written, it is possible to easily understand the content of the writing in the notebook.

Solution to Problem

The information processing system according to the present invention is an information processing system including a mobile terminal and a data management apparatus that is connected to the mobile terminal via a network; wherein the mobile terminal includes: a touch panel unit that displays pages of a notebook; an input receiving unit that receives writing on the page via the touch panel unit; an application executing unit that together with receiving writing by the input receiving unit, is capable of executing at least one or more application; a recording request unit that respectively adds time stamps to the writing data received by the input receiving unit and the execution contents of each application executed by the application executing unit, and as playback data of a written page, transmits a recording request to the data management apparatus; an acquisition request unit that, when displaying a written page on the touch panel unit, performs an acquisition request for playback data of the written page, and receives the playback data from the data management apparatus; and a playback processing unit that, based on the time stamps, synchronously plays back the writing data and the execution contents included in the playback data received by the acquisition request unit; and the data management apparatus includes: a recording request receiving unit that receives a recording request for the playback data from the mobile terminal; a data storage unit that stores the playback data for which a recording request has been received by the recording request receiving unit for each page of the notebook; and an acquisition request responding unit that searches the data storage unit for the playback data requested to be acquired in response to an acquisition request from the mobile terminal and transmits the playback data to the mobile terminal.

The information processing system according to the present invention is an information processing system that includes a plurality of mobile terminals, and a data management apparatus that is connected to the plurality of mobile terminals via a network; wherein each of the mobile terminals includes: an authenticating unit that performs user authentication based on inputted authentication information; a touch panel unit that displays a user's own page that is a page of the user's own notebook together with a page of another user that is the page of the another user's notebook; an input receiving unit that receives writing for copying a copy target area that is selected from the another user's page via the touch panel unit to the user's own page; an application executing unit that together with receiving writing by the input receiving unit, is capable of executing at least one or more application; a recording request unit that respectively adds time stamps to the copy-and-paste data received by the input receiving unit and the execution contents of each application executed by the application executing unit, and as playback data of a written page, transmits a recording request to the data management apparatus; an acquisition request unit that, when displaying the written page on the touch panel unit, performs an acquisition request for the playback data of the written page, and receives the playback data from the data management apparatus; and a playback processing unit that, based on the time stamps, synchronously plays back the copy-and-paste data and the execution contents included in the playback data received by the acquisition request unit; the data management apparatus includes: a recording request receiving unit that receives a recording request for the playback data from the mobile terminal; a data storage unit that stores the playback data for which a recording request has been received by the recording request receiving unit for each page of the notebook of each user; and an acquisition request responding unit that searches the data storage unit for the playback data requested to be acquired in response to an acquisition request from the mobile terminal and transmits the playback data to the mobile terminal; and the recording request receiving unit, in the case where a recording request for the copy-and-paste data that is copied from the another user's page is received, copies the playback data of the another user corresponding to the copy target area and stores the playback data in the data storage unit as playback data of user's own page.

The information processing method according to the present invention is an image processing method executed by an information processing system including a mobile terminal and a data management apparatus that is connected to the mobile terminal via a network; whereby the mobile terminal: displays pages of a notebook on a touch panel unit; receives writing on the page via the touch panel unit; executes at least one or more application together with receiving writing; respectively adds time stamps to received writing data and execution contents of each executed application, and as playback data of a written page, transmits a recording request to the data management apparatus; when displaying the written page on the touch panel unit, performs an acquisition request for the playback data of the written page, and receives the playback data from the data management apparatus; and based on the time stamps, synchronously plays back the writing data and the execution contents included in the received playback data; and the data management apparatus: receives a recording request for the playback data from the mobile terminal; stores the playback data for which a recording request has been received for each page of the notebook in a data storage unit; and searches the data storage unit for the playback data requested to be acquired in response to an acquisition request from the mobile terminal and transmits the playback data to the mobile terminal.

Advantageous Effects of Invention

With the present invention it is possible to reproduce writing in a notebook together with the situation in which the writing is written, thereby making it possible to easily understand the contents of writing in a notebook.

BRIEF DESCRIPTION OF DRAWINGS

FIG. 8 is a diagram illustrating an example of recording playback data illustrated in FIG. 7.

FIG. 14 is a diagram illustrating playback data of another user corresponding to a copy target area.

FIG. 17 is a diagram illustrating how the playback data corresponding to a divided copy target area is copied.

FIG. 20 is a diagram illustrating how a timer interrupt is generated during playback of playback data.

DESCRIPTION OF EMBODIMENTS

Embodiments of the present invention will be described in detail below with reference to the drawings. Incidentally, in the following embodiments, the same reference numbers are given to configurations indicating similar functions.

<System Configuration>

Figure 1:
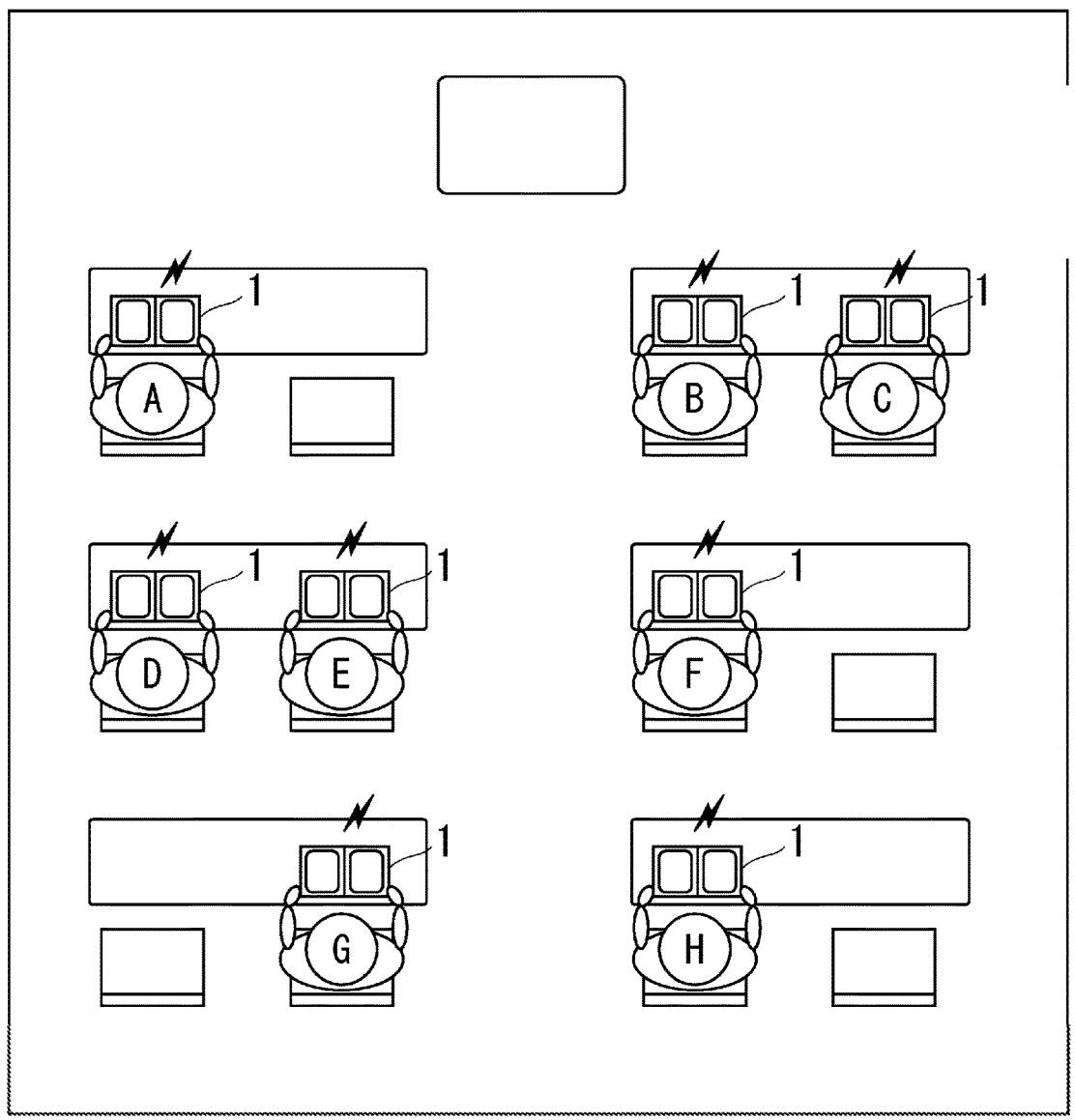
FIG. 1 is a system configuration diagram of an information processing system according to an embodiment of the present invention.

As illustrated in FIG. 1, the information processing system X of the present embodiment includes mobile terminals 1 that are used by users such as a students or the like themselves as notebooks, and a data management apparatus 2 that is connected to the mobile terminals 1 via a network 3 such as the Internet or the like.

<Configuration of a Mobile Terminal>

Figure 2:
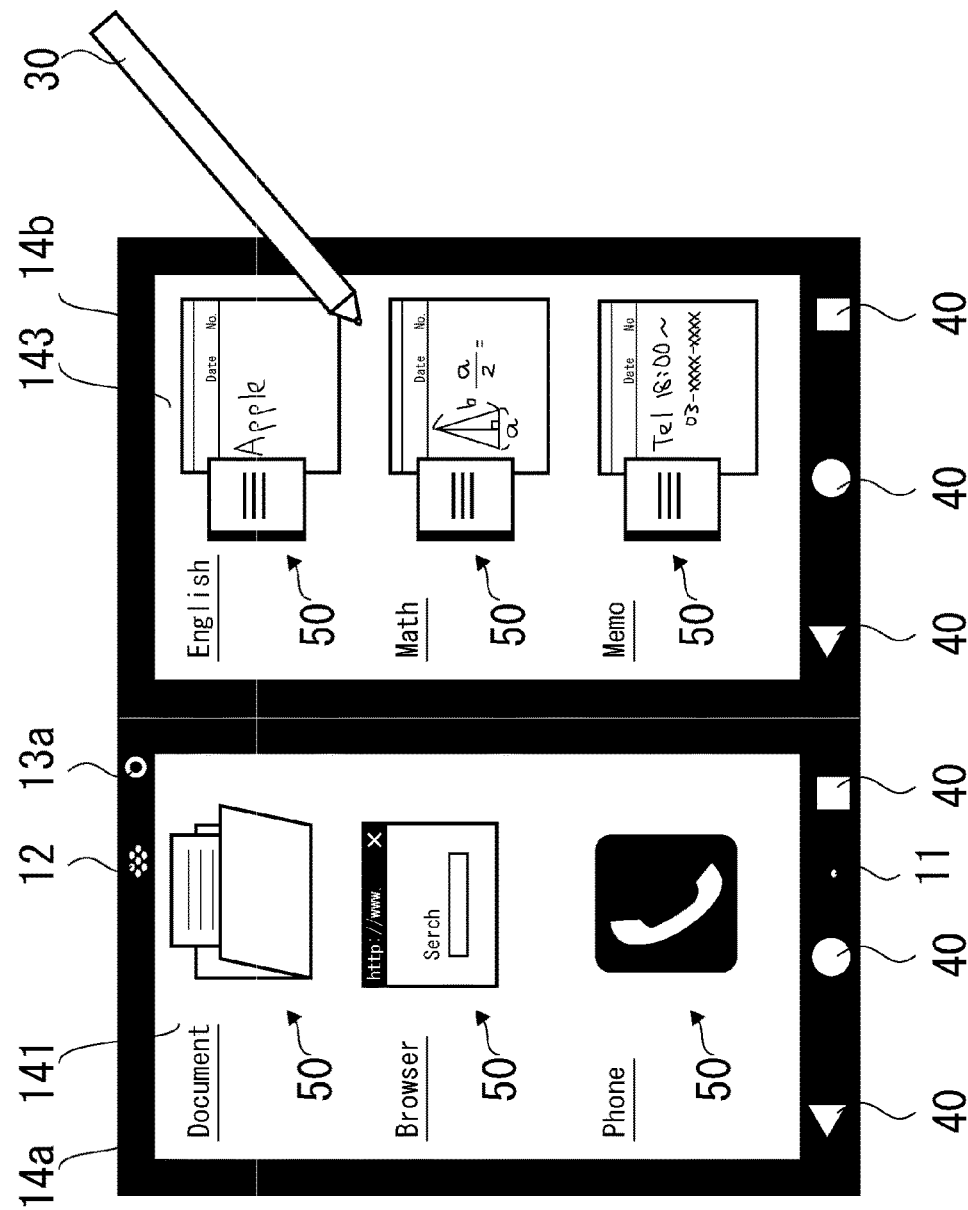
FIG. 2 is a diagram illustrating a spread open state of a mobile terminal illustrated in FIG. 1.
Figure 3:
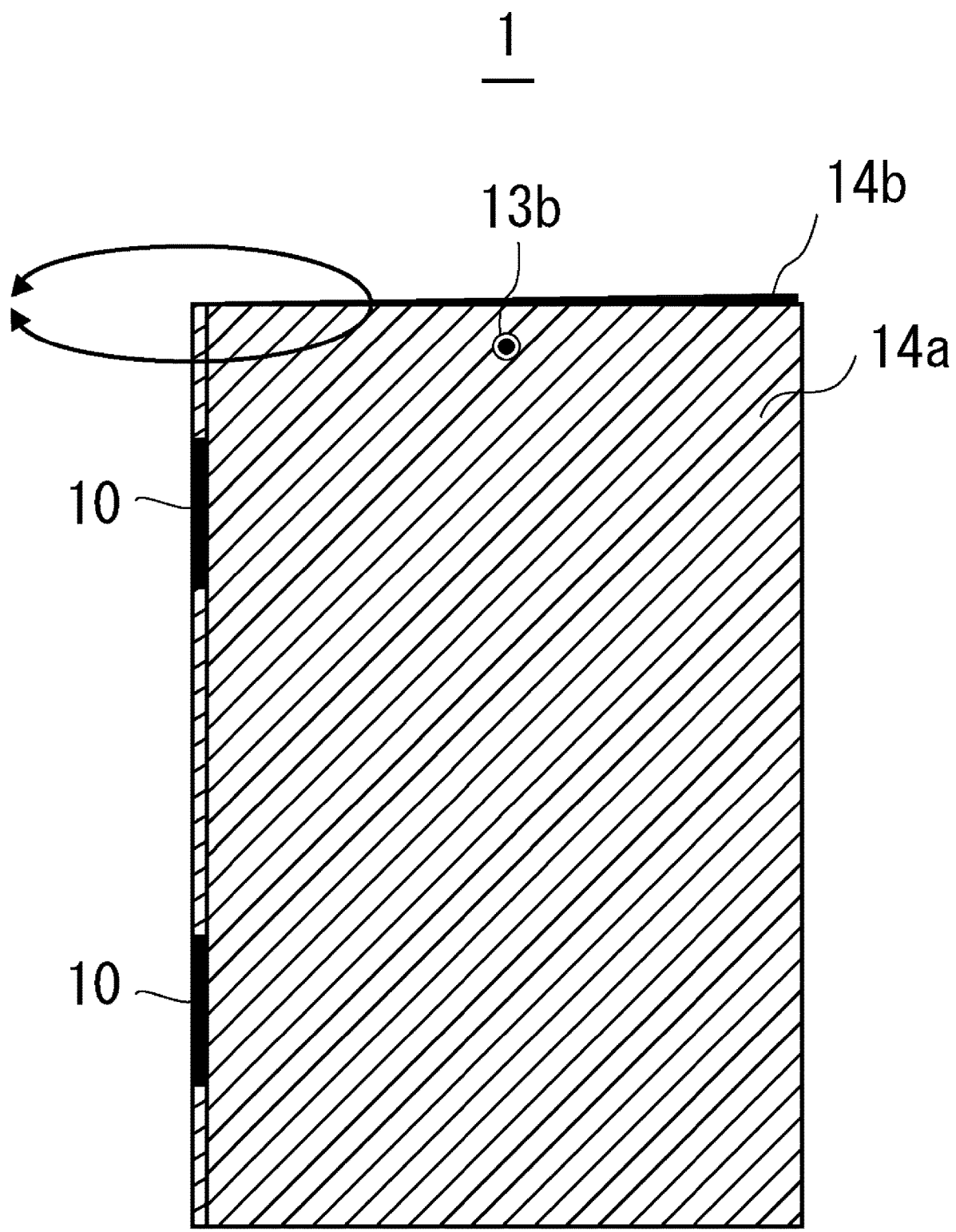
FIG. 3 is a diagram illustrating a closed state of the mobile terminal illustrated in FIG. 1.

As illustrated in FIG. 2 and FIG. 3, a mobile terminal 1 includes a first touch panel 14a and a second touch panel 14b. The first touch panel 14a and the second touch panel 14b are connected by a hinge unit 10 illustrated in FIG. 3 so as to be rotatable. By rotating the first touch panel 14a and the second touch panel 14b about a rotation axis of the hinge unit 10, the mobile terminal 1 is in a spread opened state in which a first display unit 141 of the first touch panel 14a and a second display unit 143 of the second touch panel 14b are adjacent to each other on the same plane (refer to FIG. 2), or is in a closed state in which the first display unit 141 of the first touch panel 14a and the second display unit 143 of the second touch panel 14b face each other (refer to FIG. 3).

In addition, as illustrated in FIG. 2, the first touch panel 14a is provided with a microphone 11, a speaker 12, and a front camera 13a on the front side (first display unit 141 side), and provided with a rear camera 13b illustrated in FIG. 3 on the rear side. The positions where the microphone 11, the speaker 12, the front camera 13a, and the rear camera 13b are provided may be changed as appropriate, and are not limited to the first touch panel 14a, but may be provided on the second touch panel 14b. In addition, the first touch panel 14a and the second touch panel 14b are provided with operation buttons 40 that receive various operations. The operation buttons 40 may be hard keys or software keys.

Figure 4:
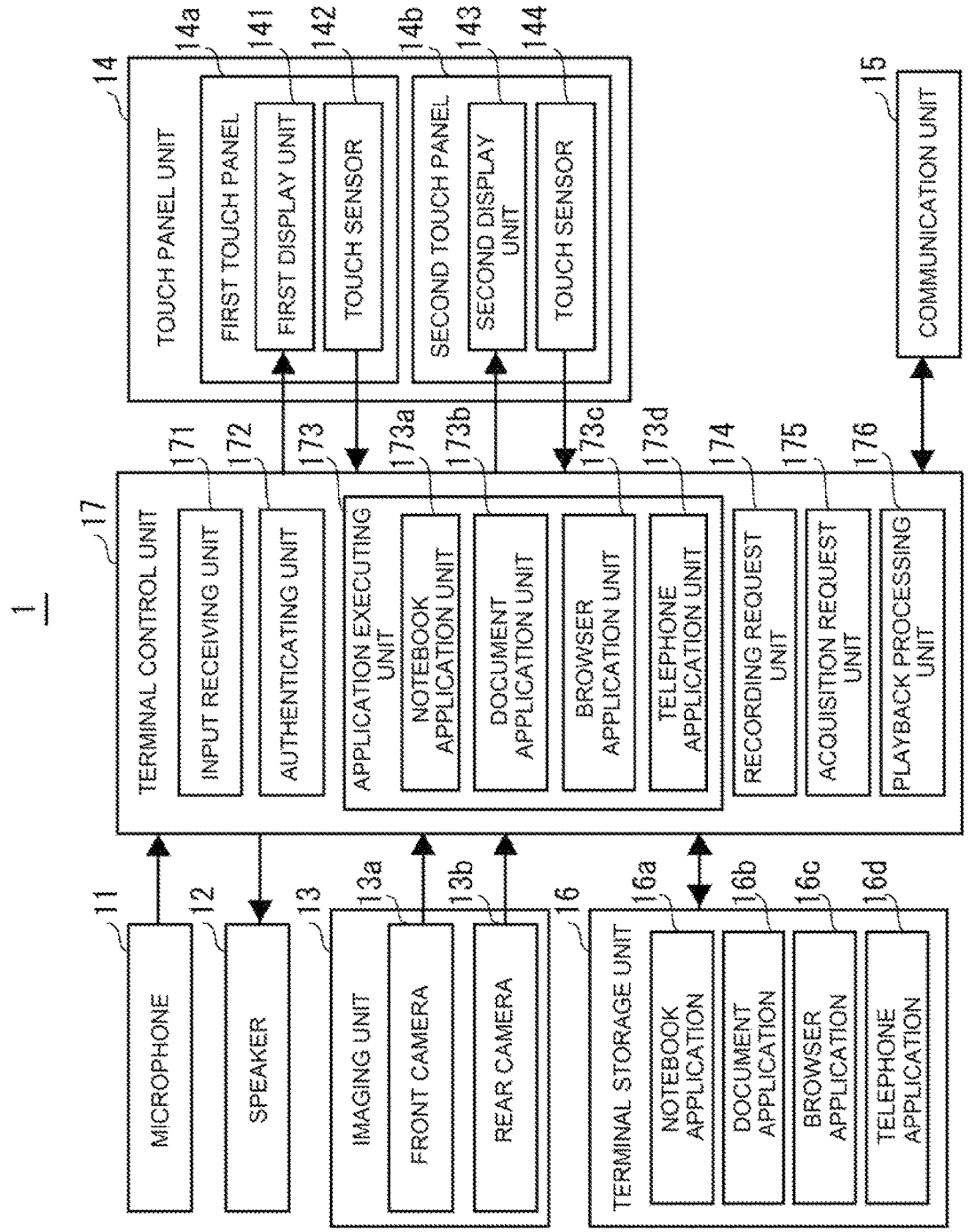
FIG. 4 is a block diagram illustrating a configuration of a mobile terminal illustrated in FIG. 1.

FIG. 4 is a functional block diagram illustrating the configuration of a mobile terminal 1. The mobile terminal 1 includes a microphone 11, a speaker 12, an imaging unit 13, a touch panel unit 14, a terminal storage unit 16, a communication unit 15, and a terminal control unit 17.

The microphone 11 generates audio data based on input audio and outputs the audio data to the terminal control unit 17.

The speaker 12 outputs audio to the outside based on the audio data inputted from the terminal control unit 17.

The imaging unit 13 includes a front camera 13a and a rear camera 13b, and outputs image data captured by the front camera 13a and the rear camera 13b, respectively, to the terminal control unit 17. The imaging unit 13 has a function of capturing still images and video.

The touch panel unit 14 includes a first touch panel 14a and a second touch panel 14b. The first touch panel 14a includes a first display unit 141 and a touch sensor 142. The first display unit 141 is a liquid crystal display, an organic EL display, a plasma display, or the like. The first display unit 141 is provided with a touch sensor 142 formed into a transparent sheet shape on the display surface.

The second touch panel 14b includes a second display unit 143 and a touch sensor 144. The second display unit 143 is electronic paper. The second display unit 143 is provided with a touch sensor 144 formed into a transparent sheet shape on the display surface. Incidentally, not only the second display unit 143 but also the first display unit 141 may be configured of electronic paper. In addition, the first display unit 141 and the second display unit 143 may be A4 size, which is easy to use as a notebook.

The touch sensors 142 and 144 are position input devices that detect a position on the display surface the user touches with a pointer 30 such as a stylus pen, a finger or the like and output the position coordinates corresponding to that position to the terminal control unit 17. As the touch sensors 142 and 144, capacitive type, ultrasonic type, pressure sensitive type, resistive film type, light detecting type or the like can be used.

The communication unit 15 has a function of communicating with the data management apparatus 2 and other mobile terminals 1 via the network 3 such as the Internet or the like via Wi-Fi (registered trademark), a cellular phone network or the like.

The terminal storage unit 16 is storage means such as a semiconductor memory, HDD (Hard Disk Drive) or the like.

The terminal storage unit 16 stores various application programs such as a notebook application 16a, a document application 16b, a browser application 16c, a telephone application 16d, and the like.

The notebook application 16a is an application program that creates a notebook composed of a plurality of pages and makes it possible to write in the created notebook via the second touch panel 14b.

The document application 16b is an application program for creating, displaying and editing documents in formats such as Word (registered trademark), Excel (registered trademark), PDF and the like.

The browser application 16d is an application program for displaying a Web page on the touch panel unit 14.

The telephone application 16d is an application program for realizing a telephone function. The notebook application 16a, the document application 16b, the browser application 16c, and the telephone application 16d may be web applications.

The terminal control unit 17 is connected to the microphone 11, the speaker 12, the imaging unit 13, the touch panel unit 14, the communication unit 15, and the terminal storage unit 16, respectively. The terminal control unit 17 is an information processing unit such as a microcomputer or the like including a CPU (Central Processing Unit), a ROM (Read Only Memory), a RAM (Random Access Memory), and the like. The ROM stores a control program for performing operation control of the mobile terminal 1.

The CPU of the terminal control unit 17 reads the control program stored in the ROM and develops the control program in the RAM to perform control of the entire terminal. For example, Linux (registered trademark), Android (registered trademark), cloud OS, and the like can be used as the OS (Operating System) of the terminal control unit 17. In addition, the terminal control unit 17 functions as an input receiving unit 171, an authenticating unit 172, an application executing unit 173, a recording request unit 174, an acquisition request unit 175, and a playback processing unit 176.

The input receiving unit 171 detects contact of the pointer 30 with respect to the first touch panel 14a and the second touch panel 14b by the respective touch sensors 142 and 144, and receives corresponding operations. For example, the input receiving unit 171 receives writing on a page 51 displayed on the second touch panel 14b by the notebook application 16a, and displays the point indicating the position coordinates inputted from the second touch panel 14b on the page 51. As a result, the trajectory of the position coordinates is drawn on the page 51 as handwritten data.

The authenticating unit 172 displays an authentication screen (not illustrated) for receiving input of authentication information on the touch panel unit 14. Then, the authenticating unit 172 transmits the authentication information inputted to the authentication screen via the input receiving unit 171 to the data management apparatus 2, and performs user authentication with the data management apparatus 2. For example, the data management apparatus 2 compares the authentication information (for example, user ID and password) transmitted from the authenticating unit 172 with preregistered account information (for example, user ID, password, and the like). Then, when the comparison result is a match, the data management apparatus 2 transmits, for example, an authentication success notification to the authenticating unit 172. As a result, login of the user is performed.

When the input receiving unit 171 receives an application activation operation, the application executing unit 173 activates the corresponding application program. For example, the input receiving unit 171 receives an application activation operation by touching one of the respective icons 50 illustrated in FIG. 2 corresponding to any one of the document application 16b, the browser application 16c, the telephone application 16d, and the notebook application 16a, and activates the application program corresponding to the touched icon 50.

The application executing unit 173 can execute not only one application program but also a plurality of application programs in parallel. When the notebook application 16a, the document application 16b, the browser application 16c, and the telephone application 16d are activated respectively, the application executing unit 173 respectively functions as a notebook application unit 173a for realizing the function of the notebook application 16a, a document application unit 173b for realizing the function of the document application 16b, a browser application unit 173c for realizing the function of the browser application 16d, and a telephone application unit 173d for realizing the function of the telephone application 16d.

The notebook application unit 173a, via the second touch panel 14b that is electronic paper, receives the creation, display and editing of a new notebook that includes a plurality of pages.

The document application unit 173b supports various document formats such as Word (registered trademark), Excel (registered trademark), PDF, and the like. The document application unit 173b, via the first touch panel 14a, receives the creation, display, and editing of documents such as teaching material contents or the like.

The browser application unit 173c displays a Website acquired from the Internet or the like via the communication unit 15 on the first touch panel 14a.

The telephone application unit 173d controls voice communication with other users via the communication unit 15. The telephone application unit 173d is capable of not only one-to-one calls but also group calls with a plurality of people.

Figure 5:
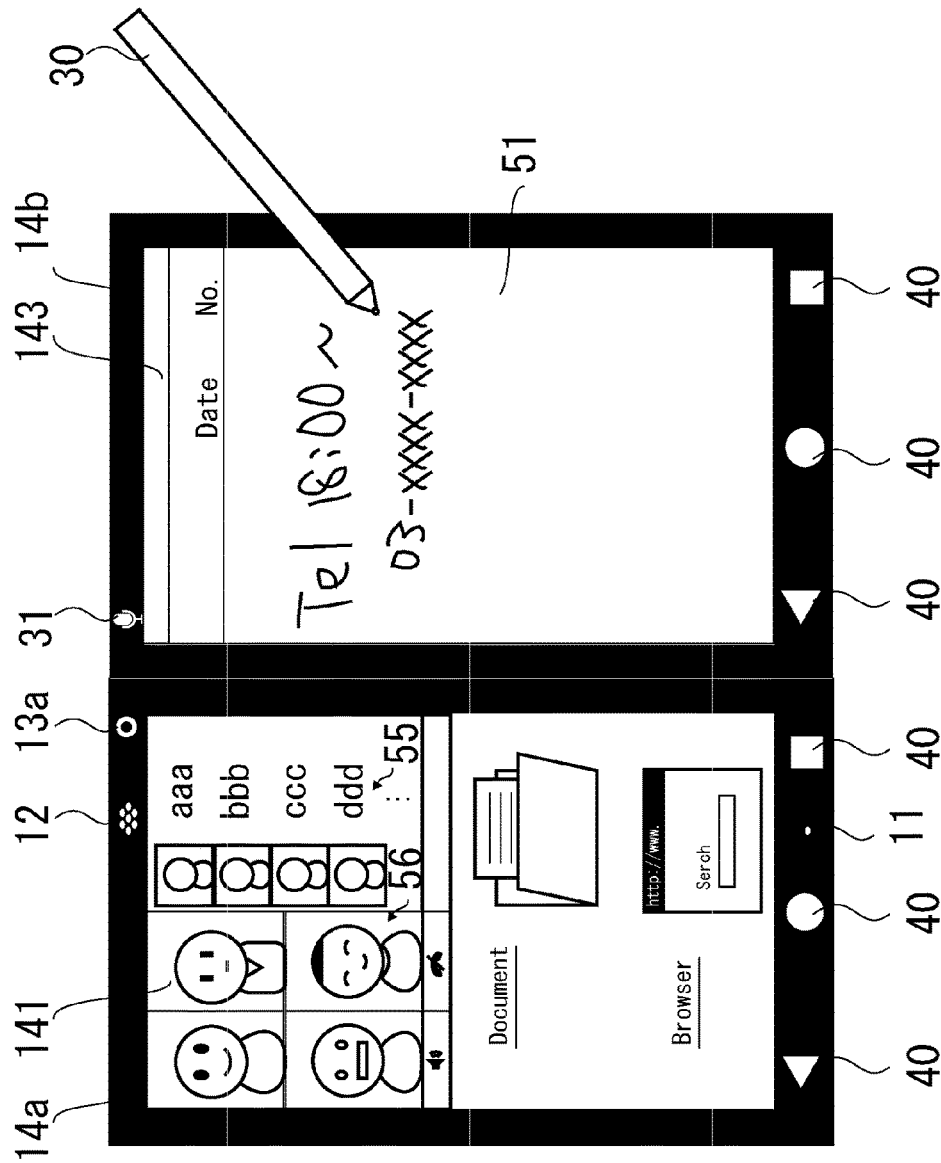
FIG. 5 is a diagram illustrating how a telephone application unit and the notebook application unit illustrated in FIG. 4 cooperate.

The telephone application unit 173d cooperates with the notebook application unit 173a. When the telephone application 16d is activated, the application executing unit 173 functions as the telephone application unit 173d and displays the address book 55 illustrated in FIG. 5 for selecting a call destination on the first touch panel 14a. At the same time, the application executing unit 173 activates the notebook application 16a, functions as the notebook application unit 173a, and displays a new page 51 on the second touch panel 14b that can be written on. The caller can write memos on the page 51 during a telephone call.

The page 51 displayed on the second touch panel 14b of the caller is registered in the data management apparatus 2 as a shared page among the call parties and is shared with the call destination. When there is an incoming call from the telephone application unit 173d on the calling side, the mobile terminal 1 on the receiving side activates the telephone application 16d by the application executing unit 173, enables a video call with the caller, and displays an image 56 indicating the person at the call destination on the first touch panel 14a. At the same time, the application executing unit 173 activates the notebook application 16a, acquires the page 51 to be shared among the call parties from the data management apparatus 2, and displays the page 51 on the second touch panel 14b. As a result, the caller and the called party can share the writing via the page 51.

For example, an MQTT (Message Queue Telemetry Transport) server may be provided in the data management apparatus 2 in order to share the writing among the call parties. The MQTT server receives the registration of the call parties for each call and notifies and reflects in real time the operations performed by one of the registered call parties on the mobile terminal 1 another of the call parties.

As a result, writing of the page 51 can be shared among the call parties. In addition, not only the page 51 but also the document data by the document application 16b and the Websites by the browser application 16c may be shared among the call parties.

The recording request unit 174 adds a time stamp to the written data written in the page 51 displayed on the second touch panel 14b via the input receiving unit 171 as playback data 60 of the written page 51, and transmits a recording request to the data management apparatus 2 in real time via the communication unit 15. In addition, in the case where writing on the page 51 is received by the input receiving unit 171, the recording request unit 174 adds a time stamp to execution contents or the like of the document application 16b, browser application 16c and telephone application 16d executed by the application executing unit 173 as playback data 60 of the written page 51, and via the communication unit 15, transmits a recording request in real time to the data management apparatus 2. Incidentally, the time stamp is information indicating the current time measured by a timing unit (not illustrated). In addition, the recording request unit 174 can include audio data generated by the microphone 11 in the playback data 60, and can include image data and the like captured by the imaging unit 13 in it.

When the written page 51 (the page 51 on which the playback data 60 has been transmitted by the recording request unit 174) is displayed on the second touch panel 14b, the acquisition request unit 175 transmits an acquisition request for the playback data 60 of the page 51 to the data management apparatus 2 via the communication unit 15, and receives the playback data 60 from the data management apparatus 2.

The playback processing unit 176 plays back the writing data and the execution contents included in the playback data 60 acquired by the acquisition request unit 175 in synchronization based on the time stamps added to each.

<Configuration of the Data Management Apparatus>

Figure 6:
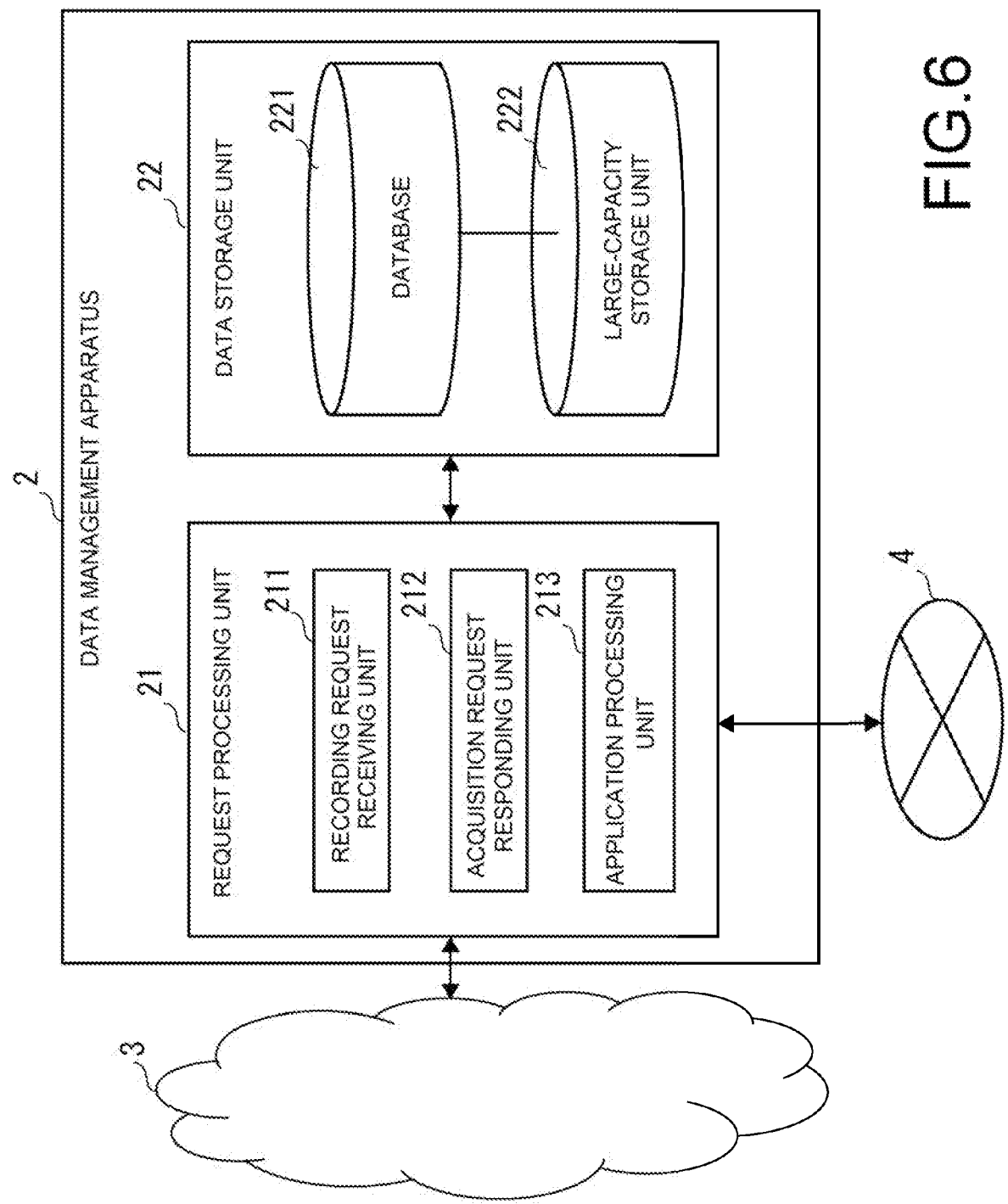
FIG. 6 is a block diagram showing a configuration of the data management apparatus illustrated in FIG. 1.

FIG. 6 is a schematic configuration diagram of the data management apparatus 2. As illustrated in FIG. 6, the data management apparatus 2 includes a request processing unit 21 and a data storage unit 22. The data management apparatus 2 may be a cloud system.

The request processing unit 21 has a function of processing a request from a mobile terminal 1 and may be composed of a plurality of Web servers. The request processing unit 21 includes a recording request receiving unit 211, an acquisition request responding unit 212, and an application processing unit 213.

The recording request receiving unit 211 receives a recording request for the playback data 60 transmitted from the mobile terminal 1 via the network 3, and stores the playback data 60 in the data storage unit 22.

The data storage unit 22 may include a database server, for example. The data storage unit 22 has a database 221 and a large-capacity storage unit 222, and stores the playback data 60 received by the recording request receiving unit 211.

Figure 7:
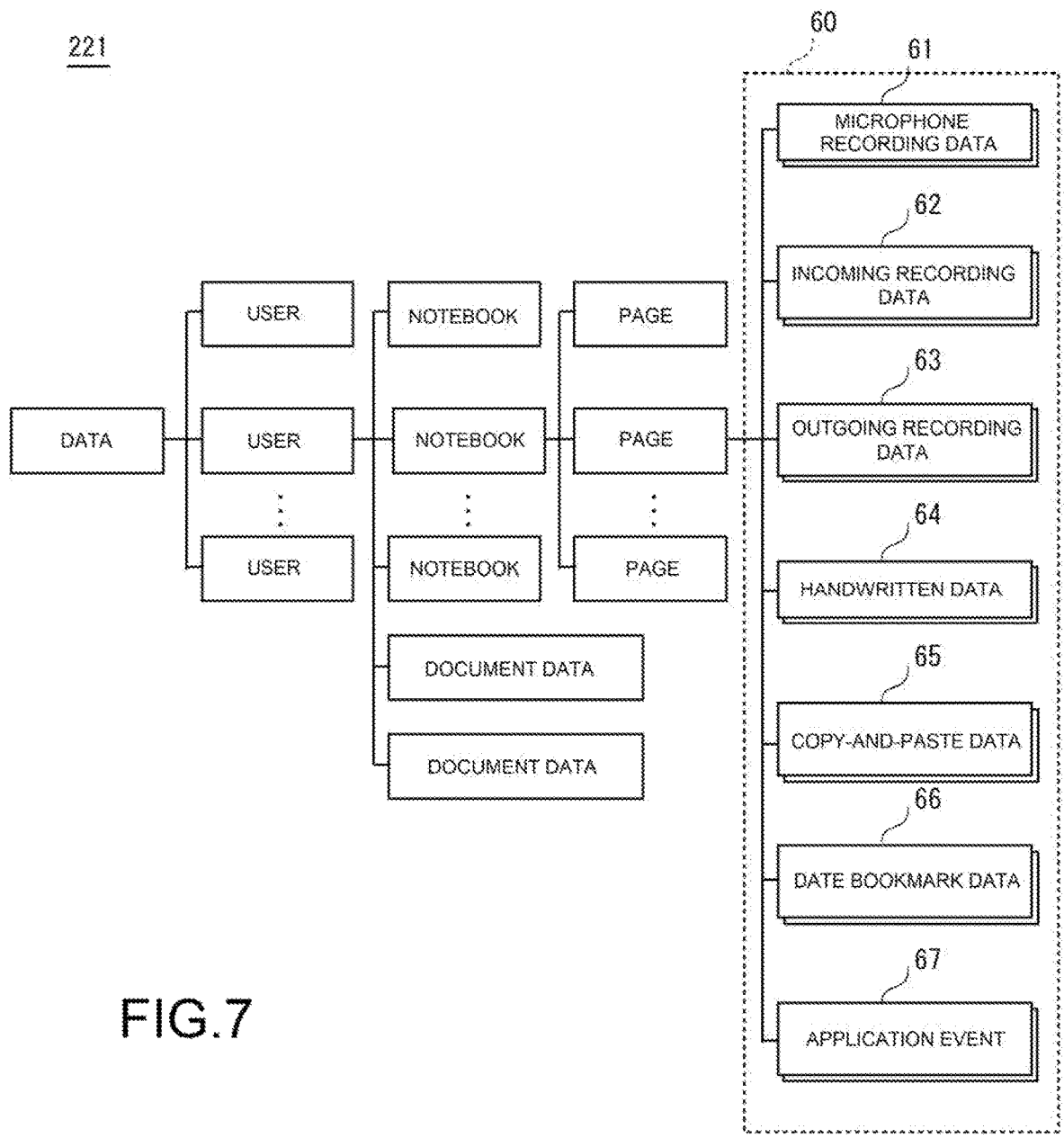
FIG. 7 is a directory configuration diagram of the database illustrated in FIG. 6.

FIG. 7 is a diagram illustrating the directory structure of the database 221. The database 221 has a hierarchical structure composed of the directories "data", "user", "notebook", and "page" in that order. "User" is provided for each user, and is provided so as to be distinguishable by a user ID or the like. "Notebook" is provided for each notebook created by a user, and is provided so as to be distinguishable by a notebook name or the like. "Page" is provided for each page 51 composed of a notebook, and is provided so as to be distinguishable by a page ID or the like.

Playback data 60 transmitted from a mobile terminal 1 is stored under "page" as page data. The playback data 60 includes the microphone recording data 61, incoming recording data 62, outgoing recording data 63, handwritten data 64, copy-and-paste data 65, date bookmark data 66, and an application event 67. The handwritten data 64 and the copy-and-paste data 65 are writing contents drawn on a page 51, but the microphone recording data 61, the incoming recording data 62, the outgoing recording data 63, the application event 67, and the like is reference information that the user refers to for writing on a page 51. In other words, for each page 51 of each notebook owned by each user, a database 221 is stored together with writing contents for a page 51 and reference information that is referenced with writing on a page 51.

FIG. 8 is a diagram illustrating a recording example of playback data 60. Microphone recording data 61, incoming recording data 62, and outgoing recording data 63 are recorded in an audio file format such as way or the like. Handwritten data 64 is recorded in a vector format such as SVG or the like. In addition, copy-and-paste data 65 is recorded so as to include characters, images, urls of link destinations and the like. Date bookmark data 66 records date and time information. An application event 67 records the execution content of applications.

Incidentally, in FIG. 7, document data is stored under "user". When an application event 67 of the document application unit 173b is included in the playback data 60, the application event 67 includes the file name of the document data displayed by the document application unit 173b. Therefore, when an application event 67 of the document application unit 173b is included in the playback data 60, the document application unit 173b can acquire and display the document data to be displayed from the data management apparatus 2 based on the application event 67.

The large-capacity storage unit 222 is a large-capacity storage means such as an HDD or the like, and stores various data in formats such as WAV, XML, SVG, JSON, PDF, Word (registered trademark), Excel (registered trademark) and the like. The substance of data having a large data amount such as the microphone recording data 61, the incoming recording data 62, the outgoing recording audio data 63, the handwritten data 64, and the document data are stored in the large-capacity storage unit 222.

The acquisition request responding unit 212 receives a request from the mobile terminal 1 via the network 3 to acquire playback data 60 and searches for the playback data 60 of the page 51 requested for acquisition from the data storage unit 22. Then, the acquisition request responding unit 212 transmits the playback data 60 found by the search to the mobile terminal 1 via the network 3.

The application processing unit 213 performs various application processes in response to requests from each application executed by the application executing unit 173 of the mobile terminal 1. For example, the application processing unit 213 performs call control via a network 4 such as a public telephone line or the like in response to a request from the telephone application unit 173d. The data management apparatus 2 may be provided with a WebRTC gateway, an IP-PBX, and a SIP server for performing a telephone call control process. In addition, the application processing unit 213 includes a notebook application server that provides functions of the notebook application unit 173a, a document application server that provides functions of the document application unit 173b, a browser server that provides functions of the browser application unit 173c, and a telephone server that provides the functions of the telephone application unit 173d.

<Recording Process>

Figure 9:
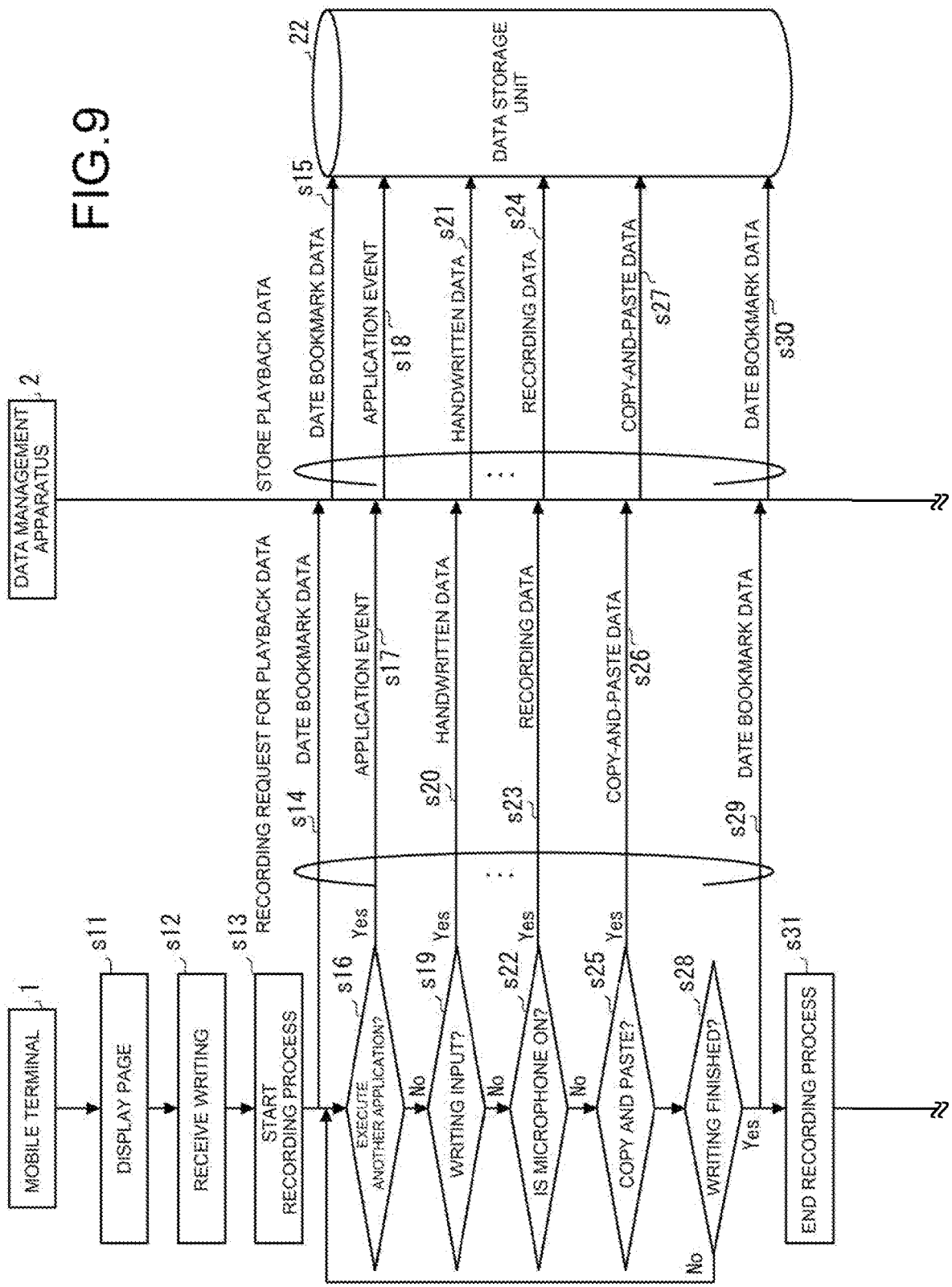
FIG. 9 is a flowchart illustrating a flow of a recording process of the information processing system illustrated in FIG. 1.

Next, the flow of the recording process of the playback data 60 will be described with reference to FIG. 9. Incidentally, it is presumed that user authentication has been completed between the mobile terminal 1 and the data management apparatus 2 by the authenticating unit 172 in advance.

When the application executing unit 173 of the mobile terminal 1 displays a page 51 by the notebook application 16a on the second touch panel 14b (s11), the input receiving unit 171 receives writing on the page 51 (s12) according to operation by the user (s12). When the page 51 is displayed on the second touch panel 14b, the user can select whether to perform writing on the displayed page 51 or to play back the playback data 60 as described later.

Continuing, the recording request unit 174 starts the recording process (s13), creates date bookmark data 66 indicating the recording start date and time, adds a time stamp and transmits a recording request to the data management apparatus 2 as playback data 60 of the page 51 (s14).

The recording request receiving unit 211 of the data management apparatus 2 receives the recording request from the recording request unit 174 and stores the date bookmark data 66 transmitted from the recording request unit 174 as the playback data 60 under the page 51 in the data storage unit 22 (s15).

Continuing, the recording request unit 174 determines whether or not another application that is an application other than the notebook application 16a has been executed by the application executing unit 173 (s16). In the case where another application such as the document application 16b, the browser application 16c, the telephone application 16d, or the like is not being executed (s16: NO), the process proceeds to s19.

On the other hand, in the case where another application is executed by the application executing unit 173 (s16: YES), the recording request unit 174 acquires the application event 67 indicating the execution contents of the respective executed applications, adds a time stamp, and transmits a recording request to the data management apparatus 2 as playback data 60 of the page 51 (s17).

Figure 10:
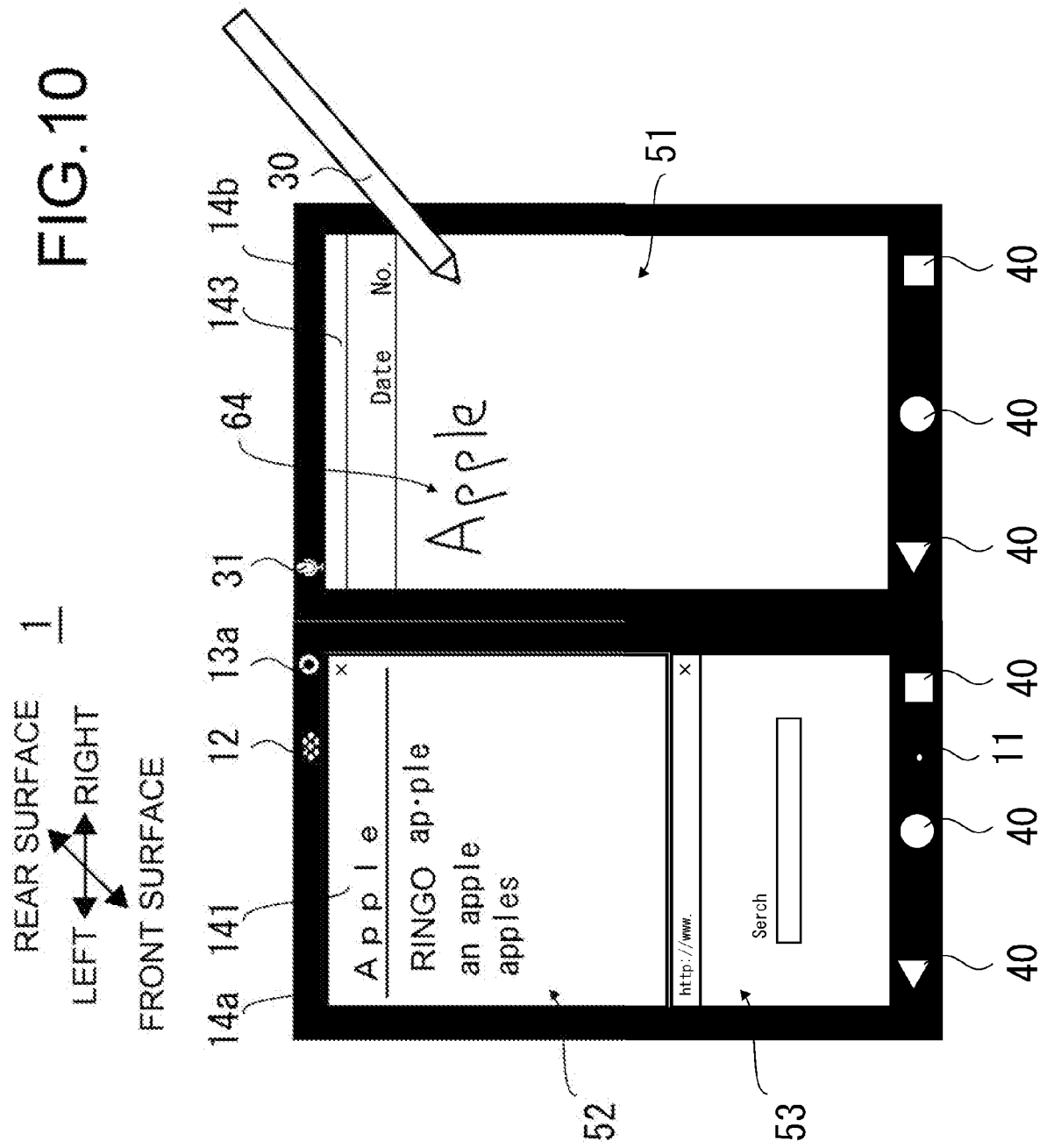
FIG. 10 is a diagram illustrating a state of referencing document data and a web page when writing on a page of a notebook.

For example, as illustrated in FIG. 10, it is presumed that when the page 51 is being written on, document data 52 by the document application 16b and a Website 53 by the browser application 16d are displayed on the first touch panel 14a. In this case, the application event 67 indicating the execution content of the document application 16b and the application event 67 indicating the execution content of the browser application 16c are acquired, time stamps are added to each of them, and the application events 67 are transmitted as playback data 60. As a result, it is possible to record the information related to the document data 52 or the Website 53 referred to by the user when writing on the page 51 in correlation with the page 51.

The recording request receiving unit 211 of the data management apparatus 2 receives a recording request from the recording request unit 174 and stores the application event 67 transmitted from the recording request unit 174 as playback data 60 under the page 51 in the data storage unit 22 (s18).

Continuing, the recording request unit 174, by the input receiving unit 171, determines whether or not handwriting input has been performed on the page 51 (s19). In the case where handwriting input is not performed (s19: NO), the process proceeds to s22. On the other hand, in the case where the handwriting input is performed on the page 51 (s19: YES), the recording request unit 174, by the input receiving unit 171, acquires the handwritten data 64 written on the page 51, adds a time stamp, and as playback data 60 of the page 51, transmits a recording request to the data management apparatus 2 (s20).

The recording request receiving unit 211 of the data management apparatus 2 receives the recording request from the recording request unit 174 and stores the handwritten data 64 transmitted from the recording request unit 174 as playback data 60 under the page 51 in the data storage unit 22 (s21).

Next, the recording request unit 174, by the input receiving unit 171, determines whether or not the microphone button 31 is turned ON (s22).

The microphone button 31 is displayed on the touch panel unit 14 in the case where the input receiving unit 171 receives writing on the page 51. Every time the microphone button 31 is touched via the touch panel unit 14, the microphone button 31 is switched between ON and OFF. While the microphone button 31 is ON, audio data based on input audio is generated by the microphone 11 and recording is performed. In the case where the microphone button 31 is turned ON while not in a call, the audio data generated by the microphone 11 is acquired by the recording request unit 174 as microphone recording data 61. In the case where the microphone button 31 is turned ON during a call, the audio data generated by the microphone 11 is acquired by the recording request unit 174 as the outgoing recording data 63, and the audio data of the called party that incomes via the network 3 is acquired as the incoming recording data 62 by the recording request unit 174.

In the case where the microphone button 31 is not ON (s22: NO), the process proceeds to s25. On the other hand, in the case where the microphone button 31 is turned ON (s22: YES), the recording request unit 174 acquires the microphone recording data 61, or the outgoing recording audio data 63 and the incoming audio recording data 62 as recording data according to the calling situation, adds a time stamp, and as playback data 60 of the page 51, transmits a recording request to the data management apparatus 2 (s23). As a result, for example, it is possible to record the audio of a lecturer, call or the like.

The recording request receiving unit 211 of the data management apparatus 2 receives the recording request from the recording request unit 174 and stores the recording data transmitted from the recording request unit 174 as playback data 60 under the page 51 in the data storage unit 22 (s24).

Continuing, the recording request unit 174, by the input receiving unit 171, determines whether or not copying and pasting has been performed on the page 51 (s25). In the case where copying and pasting is not performed (s25: NO), the process proceeds to s28.

On the other hand, in the case where copying and pasting is performed (s25: YES), the recording request unit 174, by the input receiving unit 171, acquires the copy-and-paste data 65 written on the page 51, adds a time stamp, and as playback data 60 of the page 51, and transmits a recording request to the data management apparatus 2 (s26).

Figure 11:
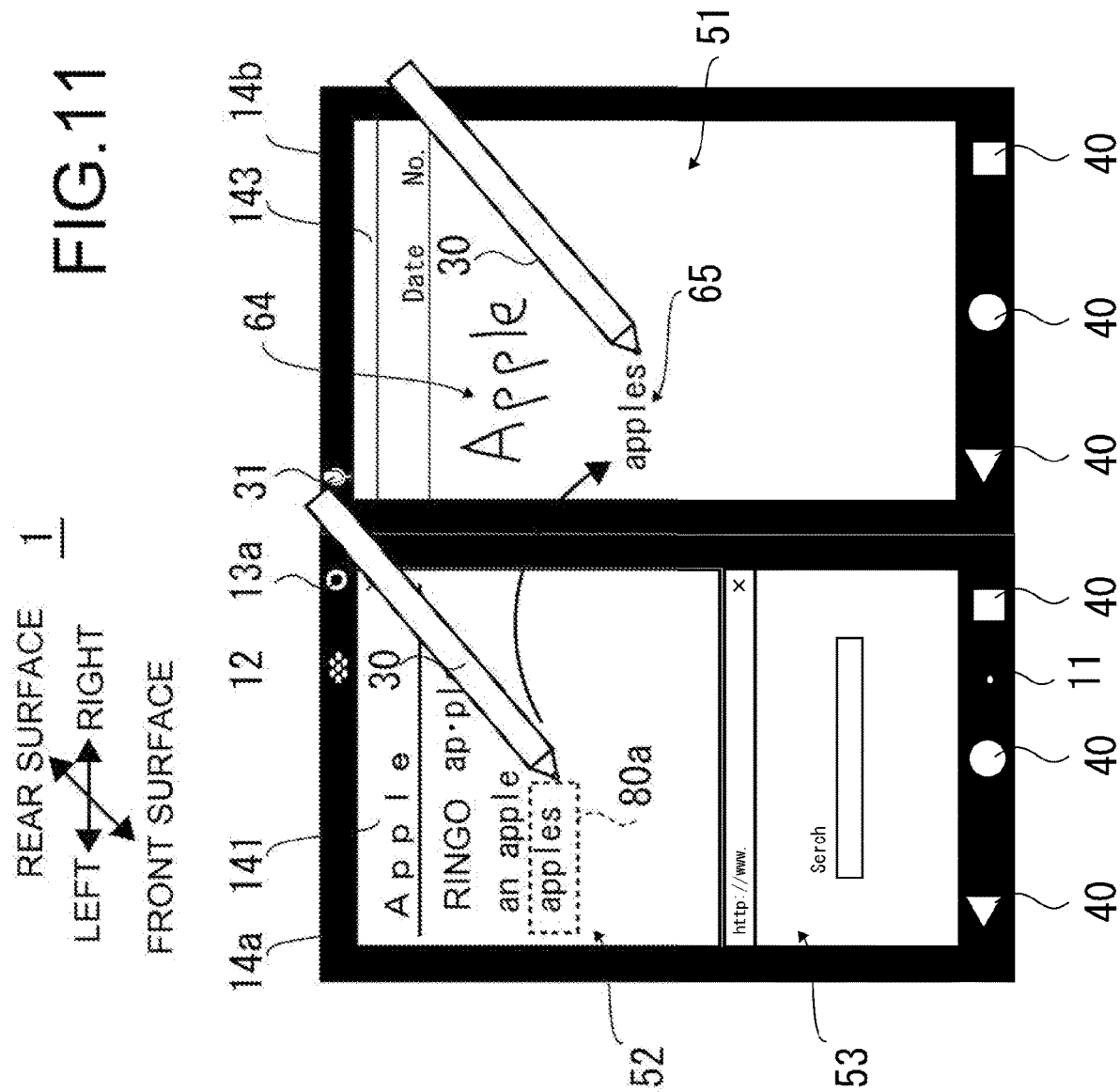
FIG. 11 is a diagram illustrating a state in which document data is copied and pasted to a page of a notebook.

For example, as illustrated in FIG. 11, the user can perform copying and pasting by selecting a copy target area 80a from the document data 52 or the Website 53 using the pointer 30, copying the characters, images, or link information in the selected copy target area 80a, and then pasting at a designated position on the page 51.

The recording request receiving unit 211 of the data management apparatus 2 receives a recording request from the recording request unit 174 and stores the copy-and-paste data 65 transmitted from the recording request unit 174 as playback data 60 under the page 51 in the data storage unit 22 (s27).

Continuing, the recording request unit 174 determines whether or not the reception of the writing by the input receiving unit 171 has ended (s28). For example, in the case where according to a user operation an operation for closing the notebook is performed or a display operation for the next page is performed, the reception of writing on the page 51 being displayed is terminated. In the case where reception of writing has not ended (s28: NO), the process returns to s16 and the processing from s16 to s28 is repeated. In other words, while the input receiving unit 171 is receiving writing on the page 51, the recording request unit 174 performs the recording request for playback data 60.

In the case where reception of writing by the input receiving unit 171 has ended (s28: YES), the recording request unit 174 creates date bookmark data 66 indicating the recording end date and time, adds a time stamp, and as playback data 60 of the page 51, transmits a recording request to the data management apparatus 2 (s29).

The recording request receiving unit 211 of the data management apparatus 2 receives the recording request from the recording request unit 174 and stores the date bookmark data 66 transmitted from the recording request unit 174 as playback data 60 under the page 51 in the data storage unit 22 (s30).

Next, the recording request unit 174 ends the recording process (s31). The process described above is repeated for each page 51 to be written.

Figure 12:
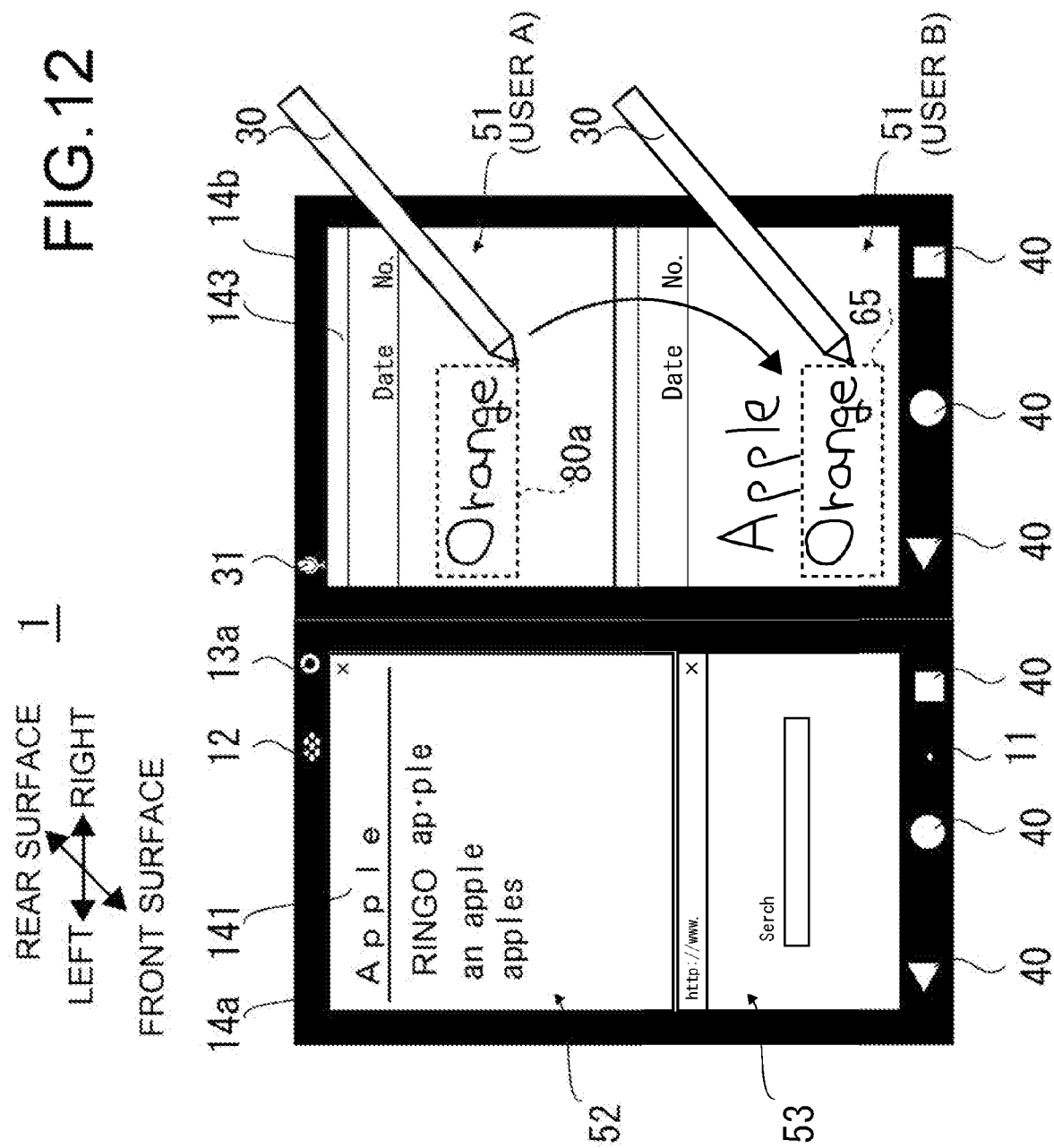
FIG. 12 is a diagram illustrating a state in which written contents of a page of another user is copied and pasted to a page of a notebook.

Incidentally, as illustrated in FIG. 12, a page 51 of a notebook created by another user (for example, user A) can be displayed on the second touch panel 14b of the user's own mobile terminal 1, and the written content on the page 51 of the user A can be copied and pasted on the user's (user B's) own page 51 to be written on. In this case, the user B, by inputting a preset authentication key, can display a page 51 permitted by the user A on his/her own mobile terminal 1. By the user A performing communication with the data management apparatus 2 via the notebook application unit 173a of his/her own mobile terminal 1 beforehand, user A can set an authentication key such as a password or the like for allowing the user B to display the page 51.

Figure 13:
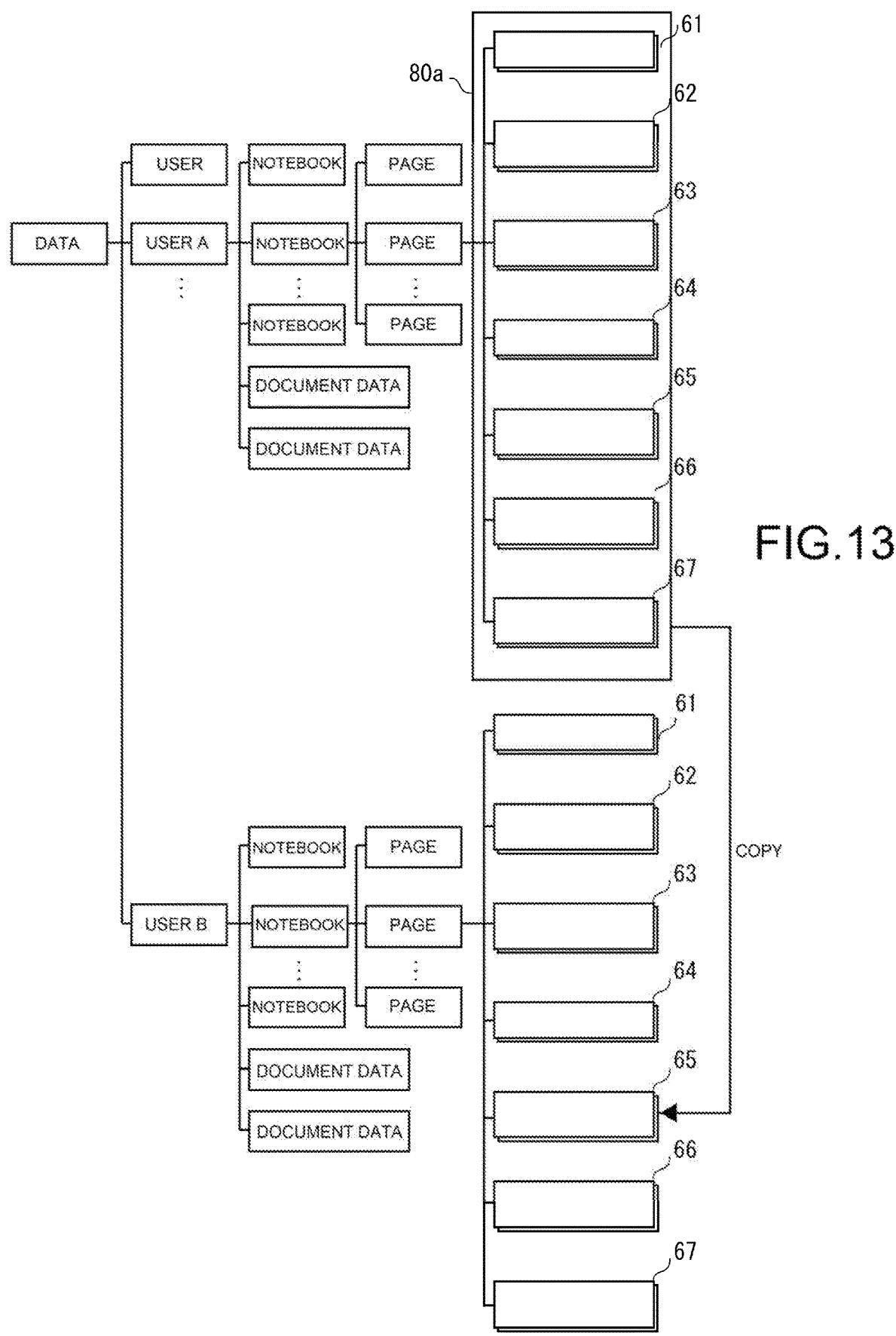
FIG. 13 is a diagram illustrating how the playback data of another user is copied to a user's own page.

In this case, when the recording request unit 174 adds a time stamp to the copy-and-paste data 65 and transmits a recording request for the playback data 60, as illustrated in FIG. 13, the recording request receiving unit 211 of the data management apparatus 2 includes the playback data 60 of the user A corresponding to the copy target area 80a as the copy-and-paste data 65 requested to be recorded, and stores that data under the page 51 of the user B.

In other words, not only the writing data (the handwritten data 64 and the copy-and-paste data 65) in the copy target area 80a, but also playback data 60 of the user A corresponding to the first time stamp to the last time stamp in the writing data in the copy target area 80a becomes the target of copying. For example, in FIG. 14, the microphone recording data 61, the handwritten data 64, the copy-and-paste data 65, and the application event 67 are included as the playback data 60 of the user A corresponding to the copy target area 80a.

As a result, the writing data of the copy target area 80a copied from the page 51 of the user A by the user B includes information such as the document data 52, the Website 53, and the like that the user A referred to when writing as the backbone, and is pasted on the page 51 of the user B.

Figure 15:
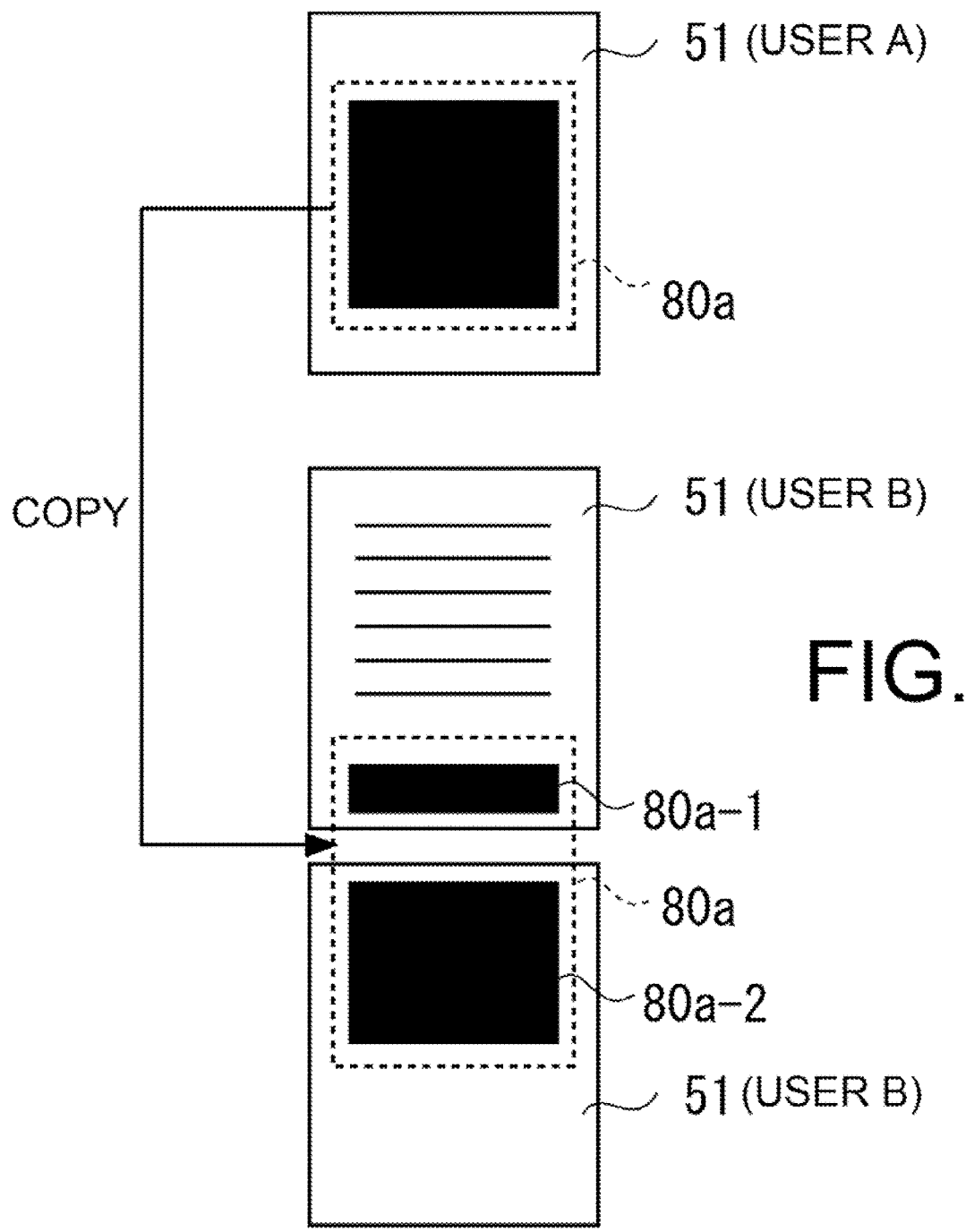
FIG. 15 is a diagram illustrating how a copy target area is divided and copied across a plurality of pages.

Incidentally, as illustrated in FIG. 15, when the copy target area 80a copied from the page 51 of the user A is pasted to the page 51 of the user B, depending on the pasted position, the copy target area 80a may in some cases be larger than the writable area (pasteable area) of the page 51 following the pasted position. In this case, the pasted copy target area 80a spreads over to the next page 51, and is divided and pasted on a continuous plurality of pages 51. In FIG. 15, the copy target area 80a is divided and pasted into the copy target areas 80a-1 and 80a-2.

Therefore, first, the recording request unit 174 adds a time stamp to the copy-and-paste data 65 based on one of the divided copy target areas 80a-1, and performs a recording request for the playback data 60. Next, since there is not enough writable area on the page 51 to be written on by the user B, the recording request unit 174 determines that writing is ended, creates date bookmark data 66 indicating the recording end date and time, adds a time stamp, and performs a recording request for the playback data 60.

Continuing, in order to paste the other divided copy target area 80a-2, the next page 51 of the user B is displayed by the notebook application 16a, and the writing is received by the input receiving unit 171. Then, the recording request unit 174 starts the recording process, creates the date bookmark data 66 indicating the recording start date and time, adds the time stamp, and performs a recording request for the playback data 60. Next, since the other divided copy target area 80a-2 is pasted to the page 51, the recording request unit 174 adds the time stamp to the copy-and-paste data 65 based on the other copy target area 80*a*-2 and performs a recording request for the playback data 60 of the user B.

Figure 16:
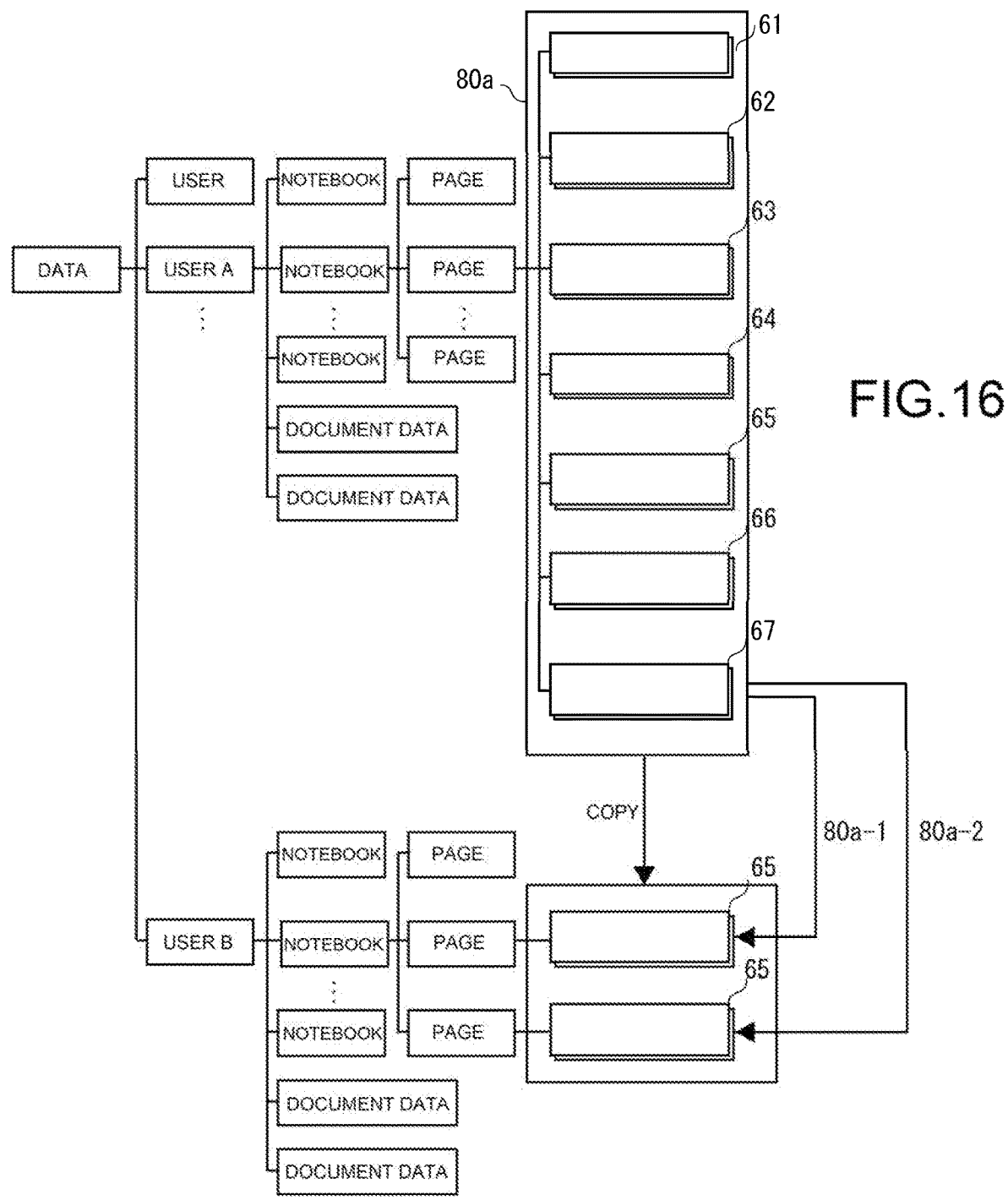
FIG. 16 is a diagram illustrating how the playback data corresponding to a divided copy target area is copied.

As a result, as illustrated in FIG. 16 and FIG. 17, the recording request receiving unit 211 causes playback data 60 corresponding to the copy target area 80*a*-1 and copy target area 80*a*-2 of the user A to be respectively copied as copy-and-paste data 65 to a continuous plurality of pages 51 of the user B in the data storage unit 22.

Incidentally, in the case where the user A, who is the copy source, has created writing data in the copy target area 80*a* that includes writing data copied from a page 51 of a user C, the copy target area 80*a* includes the playback data 60 of the user A and the playback data 60 of the user C. In this case, upon receiving the recording request for the copy-and-paste data 65 as playback data 60 from the user B, the recording request receiving unit 211 copies the playback data 60 of the plurality of users corresponding to the copy target area 80*a*, and stores that data as copy-and-paste data 65 under the page 51 of the user B.

<Playback Process>

Figure 18:
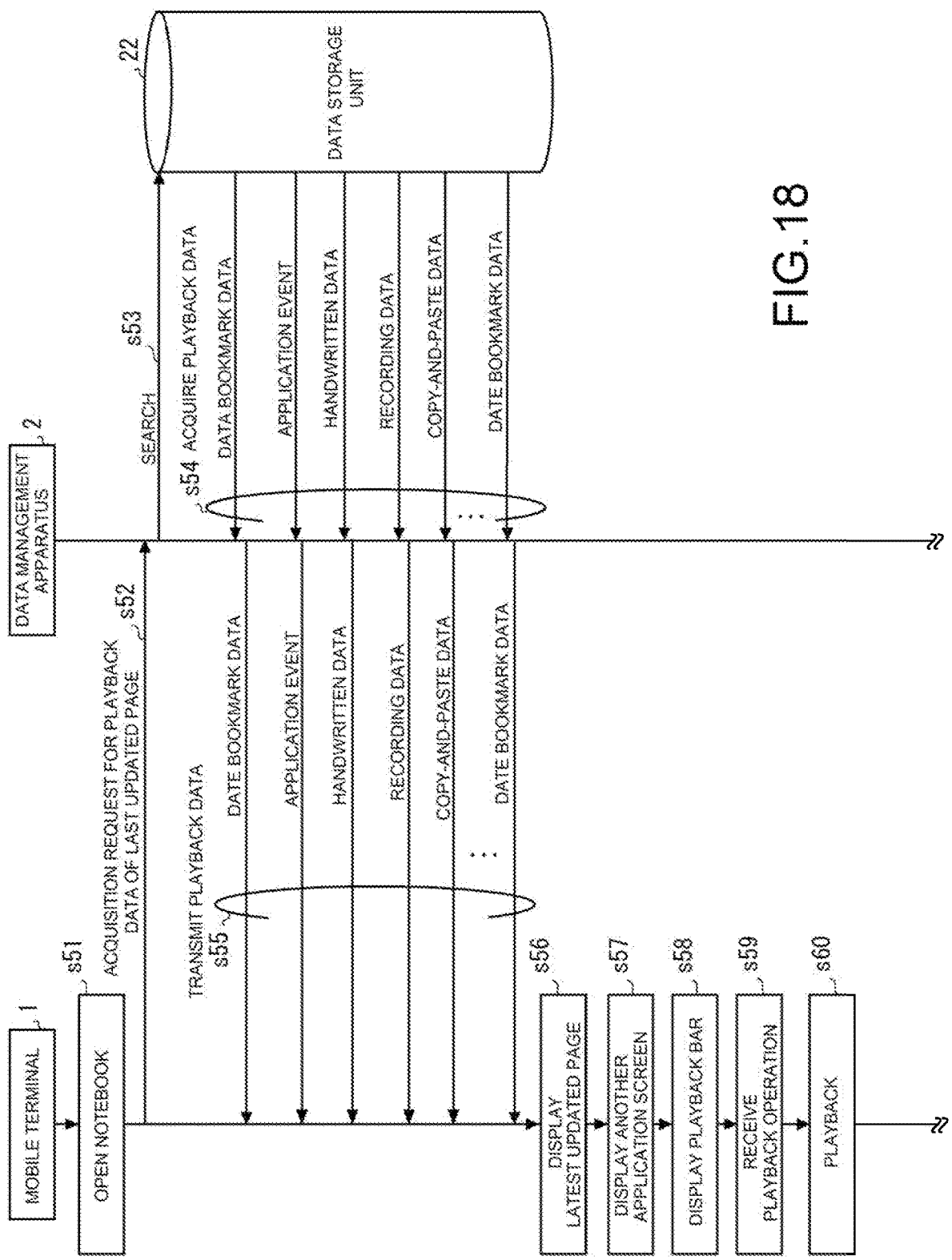
FIG. 18 is a flowchart illustrating flow of a playback process of the information processing system illustrated in FIG. 1.

Next, the flow of the playback process for playing back the playback data 60 will be described with reference to FIG. 18. Incidentally, it is presumed that user authentication has been completed between the mobile terminal 1 and the data management apparatus 2 by the authenticating unit 172 in advance.

When the input receiving unit 171 of the mobile terminal 1 receives an operation for opening a notebook (s51), the acquisition request unit 175 transmits an acquisition request to the data management apparatus 2 for the playback data 60 of the last updated page (s52). The last updated page is the page 51 displayed on the second touch panel 14*b* at the last and is the most recent page 51. In the case of a notebook that has never been opened as in the case of a new notebook, the first page may be regarded as the last updated page.

The acquisition request responding unit 212 of the data management apparatus 2 receives an acquisition request from the acquisition request unit 175 and searches the data storage unit 22 for the playback data 60 of the page 51 requested to be acquired (s53). As a result of this search, the acquisition request responding unit 212 acquires the date bookmark data 66, the application event 67, the handwritten data 64, the recording data, the copy-and-paste data 65, and the like stored in the directory of the last updated page from the data storage unit 22 as playback data 60 (s54). Incidentally, the page 51 storing the latest date and time among the date bookmark data 66 and the time stamps stored in the data storage section 22 may be specified as the last updated page. In addition, in the case where a display operation for the next page or the previous page is performed after the display of the last updated page, an acquisition request for the playback data 60 to be displayed is transmitted to the data management apparatus 2, and the page 51 to be displayed is displayed based on the playback data 60 acquired from the data management apparatus 2.

Continuing, the acquisition request responding unit 212 transmits the playback data 60 of the acquired page 51 to the mobile terminal 1 (s55). Note that in the case of a new page for which writing has never been received, playback data 60 is not stored in this directory. Therefore, in the case where a request to acquire a new page is made, empty information (for example, NULL or the like) is transmitted as the playback data 60, and only the page 51 on which nothing is written is displayed on the touch panel unit 14.

When the acquisition request unit 175 of the mobile terminal 1 acquires the playback data 60 from the data management apparatus 2, the playback processing unit 176 displays the page 51 (last updated page) on which the handwritten data 64 and the copy-and-paste data 65 included in the playback data 60 are written to the end on the second touch panel 14*b* by the notebook application 16*a* (s56).

Next, the playback processing unit 176, based on the application event 67 included in the playback data 60, displays the screen displayed last by another application other than the notebook application 16*a* on the touch panel unit 14 (s57). In other words, the screen of another application displayed on the touch panel unit 14 when the writing on the page is finished last time is displayed on the touch panel unit 14. As a result, the document data 52 and the Website 53 that were displayed last are displayed on the touch panel unit 14.

Figure 19:
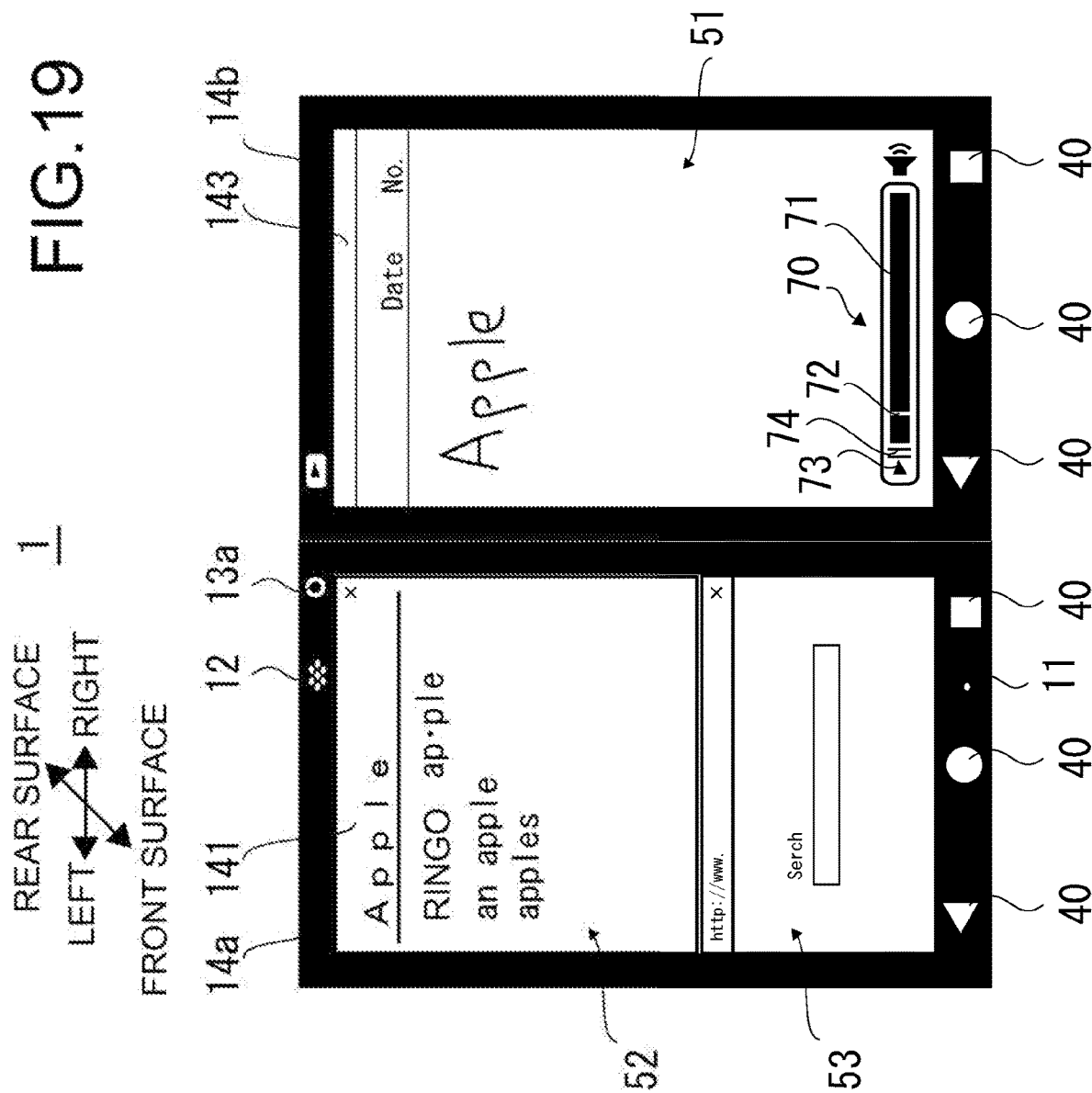
FIG. 19 is a diagram illustrating a state in which a playback bar is displayed on the mobile terminal illustrated in FIG. 1.

Continuing, the playback processing unit 176 displays a playback bar 70 as illustrated in FIG. 19 for playing back the playback data 60 on the second touch panel 14*b* (s58).

The playback bar 70 includes a playable area 71, a playback cursor 72, a playback start button 73, and a playback stop button 74, and functions as a playback operation receiving unit. The playable area 71 is an area indicating the playback time length of the playback data 60. The playback cursor 72 is a cursor indicating a playback position in the playable area 71 and can be slid to an arbitrary position within the playable area 71 via the second touch panel 14*b*. When the playback start button 73 is touched, the playback data 60 is played back from the time corresponding to the playback position of the playback cursor 72. When the playback stop button 74 is touched, the playback of the playback data 60 is stopped.

When the playback start button 73 is touched by the user and the playback bar 70 receives the playback operation (s59), the playback processing unit 176 temporarily deletes the display based on the playback data 60 after the time stamp of the time corresponding to the playback position indicated by the playback cursor 72 and plays back of the playback data 60 in order from the time stamp of the time corresponding to the playback position indicated by the playback cursor 72 (s60). As a result, from the data having the time stamp corresponding to the time indicated by the playback cursor 72 in the playback data 60 to the data having the time stamp of the last time are played back in chronological order. Incidentally, by the user touching writing data on the page 51 at a position where the user wishes to start playback, the playback processing unit 176 may play back the playback data 60 with the time stamp of the touched writing data as the playback position.

At this time, as illustrated in FIG. 20, the playback processing unit 176 generates a timer interrupt at specific time intervals (for example, every 1 second) during playback of the playback data 60. Next, the playback processing unit 176, via the acquisition request unit 175, performs an acquisition request for playback data 60 having a time stamp corresponding to within a specified time from a time corresponding to the generated timer interrupt (the time to the timer interrupt to be generated next), and acquires the playback data 60 from the data management apparatus 2. Then, the playback processing unit 176 transfers the acquired data of the corresponding period to at least one or more of the notebook application unit 173*a*, the document application unit 173*b*, the browser application unit 173*c*, and the telephone application unit 173*d* to synchronously play back the data.

In other words, the playback processing unit 176 may sequentially acquire the playback data 60 to be played back from the data management apparatus 2 via the acquisition request unit 175 and perform streaming playback. According to this, since the data amount of the playback data 60 received when displaying the last updated page on the second touch panel 14b is reduced, it is possible to immediately display the last updated page.

Thus, the process performed when the user writes on the page is reproduced, and the playback process is completed.

In this way, the information processing system of this embodiment is an information processing system that includes a mobile terminals and a data management apparatus that is connected to the mobile terminal via a network; wherein the mobile terminal includes: a touch panel unit that displays pages of a notebook; an input receiving unit that receives writing on the page via the touch panel unit; an application executing unit that together with receiving writing by the input receiving unit, is capable of executing at least one or more application; a recording request unit that respectively adds a time stamp to the writing data received by the input receiving unit and the execution contents of each application executed by the application executing unit, and as playback data of a written page, transmits a recording request to the data management apparatus; an acquisition request unit that, when displaying a written page on the touch panel unit, performs an acquisition request for playback data of the written page, and receives the playback data from the data management apparatus; and a playback processing unit that, based on the time stamps, synchronously plays back the writing data and the execution content included in the playback data received by the acquisition request unit; and the data management apparatus includes: a recording request receiving unit that receives a recording request for the playback data from the mobile terminal; a data storage unit that stores playback data for which a recording request has been received by the recording request receiving unit for each page of a notebook; and an acquisition request responding unit that searches the data storage unit for the playback data requested to be acquired in response to an acquisition request from the mobile terminal and transmits playback data to the mobile terminal.

As a result, when the user writes on a page 51 displayed on the mobile terminal 1, the document data 52, the Website 53, the audio data by the microphone 11, and the like that are referred to when writing on the page 51 are added time stamps, and together with writing data, are correlated with the page 51 and recorded as playback data 60. Then, when displaying the written page 51, it is possible to acquire the playback data of the page 51 and synchronously play back each of the data included in the playback data 60 based on the time stamps. Therefore, it is possible to reproduce the writing in the notebook together with the situation the notebook is written in, and it is possible to perform support so that the written contents of the notebook are easy for the user to understand.

Other Embodiments

In a conventional technique, even in the case where a student takes notes during a class, the contents written in the notebook are not recorded in correlation with the recording information or the like. Therefore, for example, even when a student who is absent from a class tries to play back recording information together with content while viewing writing in a notebook copied from another student, there is a problem in that the student does not know what the written contents in the notebook are based on, so it is impossible to understand the written contents.

In regard to this, the information processing system X of another embodiment is an information processing system X that includes a plurality of mobile terminals 1, and a data management apparatus 2 that is connected to the plurality of mobile terminals 1 via a network 3; wherein each mobile terminal 1 includes: an authenticating unit 172 that performs user authentication based on inputted authentication information; a touch panel unit 14 that displays a user's own page that is a page 51 of the user's own notebook together with a page of another user that is the page 51 of the another user's notebook; an input receiving unit 171 that receives writing for copying a copy target area 80a that is selected from another user's page via the touch panel unit 14 to the user's own page; an application executing unit 173 that, together with receiving writing by the input receiving unit 171, is capable of executing at least one or more application; a recording request unit 174 that respectively adds time stamps to the copy-and-paste data 65 received by the input receiving unit 171 and the execution contents of each application executed by the application executing unit 173, and as playback data of a written page 51, transmits a recording request to the data management apparatus 2; an acquisition request unit 175 that, when displaying a written page 51 on the touch panel unit 14, performs an acquisition request for playback data 60 of the written page, and receiving the playback data 60 from the data management apparatus 2; and a playback processing unit 176 that, based on the time stamps, synchronously plays back the copy-and-paste data 65 and the execution contents included in the playback data 60 received by the acquisition request unit 175; and the data management apparatus 2 includes: a recording request receiving unit 211 that receives a recording request from a mobile terminal 1 for playback data 60; a data storage unit 22 that stores the playback data 60 for which a recording request has been received by the recording request receiving unit 211 for each page 51 of a notebook of each user; and an acquisition request responding unit 212 that searches the data storage unit 22 for the playback data 60 requested to be acquired in response to an acquisition request from the mobile terminal 1 and transmits the playback data 60 to the mobile terminal 1; and the recording request receiving unit 211, in the case where a recording request for copy-and-paste data 65 that is copied from another user's page is received, copies playback data 60 of the another user corresponding to a copy target area 80a and stores the playback data 60 in the data storage unit 22 as the playback data 60 of the user's own page.

As a result, when a user copies and pastes a copy target area 80a that is selected from the page 51 of another user to the user's own page 51 displayed on the mobile terminal 1, not only the writing data in the copy target area 80a but also the execution contents of applications executed when the another user has written this writing data is copied to the user's own page 51 in the data storage unit 22. Then, in the case where the user plays back his/her own page 51 copied and pasted from the page 51 of another user, the writing by the other user at the playback location of the copy-and paste data 65 is played back together with the situation when the other user has written in the notebook. Therefore, it is possible for the user to easily understand the written contents of the notebook.

The present invention is not limited to the above-described embodiments, and it goes without saying that various modifications can be made within a range the does not depart from the spirit of the present invention.

The invention claimed is:

1. An information processing system comprising a mobile terminal and a data management apparatus that is connected to the mobile terminal via a network; wherein
the mobile terminal comprises:
a touch panel unit that displays pages of a notebook;
an input receiving unit that receives writing on the page via the touch panel unit;
an application executing unit that together with receiving writing by the input receiving unit, is capable of executing at least one application;
a recording request unit that respectively adds time stamps to the writing data received by the input receiving unit and execution contents of each of the at least one application executed by the application executing unit, and as playback data of a written page, transmits a recording request to the data management apparatus;
an acquisition request unit that, when displaying the written page on the touch panel unit, performs an acquisition request for the playback data of the written page, and receives the playback data from the data management apparatus; and
a playback processing unit that, based on the time stamps, synchronously plays back the writing data and the execution contents included in the playback data received by the acquisition request unit; and
the data management apparatus comprises:
a recording request receiving unit that receives a recording request for the playback data from the mobile terminal;
a data storage unit that stores the playback data for which a recording request has been received by the recording request receiving unit for each page of the notebook; and
an acquisition request responding unit that searches the data storage unit for the playback data requested to be acquired in response to an acquisition request from the mobile terminal and transmits the playback data to the mobile terminal.

2. The information processing system according to claim 1, wherein
the input receiving unit
receives handwritten data and copy-and-paste data as writing data of the page; and
the recording request unit
includes the handwritten data and the copy-and-paste data that received writing by the input receiving unit as the playback data.

3. The information processing system according to claim 1, wherein
the at least one application executed by the application executing unit together with reception of writing by the input receiving unit is a document application that displays document data as the execution content on the touch panel unit.

4. The information processing system according to claim 1, wherein
the at least one application executed by the application executing unit together with reception of writing by the input receiving unit is a browser application that displays a Website as the execution content on the touch panel unit.

5. The information processing system according to claim 1, further comprising a microphone that generates audio data based on inputted audio, and
the recording request unit
includes recording data based on the audio data generated by the microphone as the playback data.

6. The information processing system according to claim 1, wherein
the at least one application executed by the application executing unit together with reception of writing by the input receiving unit is a telephone application that enables a voice call with a call destination; and
the recording request unit
includes recording data based on the voice call as the playback data.

7. The information processing system according to claim 6, wherein
when the telephone application is executed by the application executing unit, the page on which writing by the input receiving unit is shared with the call destination is displayed on the touch panel unit.

8. The information processing system according to claim 1, wherein
the touch panel unit includes a first touch panel and a second touch panel;
the first touch panel and the second touch panel are connected by a hinge unit so as to be rotatable, and can be rotated to spread state in which respective display surfaces are adjacent on the same surface, and to a closed state in which the respective display surfaces are closed facing each other;
at least one of the first touch panel and the second touch panel is electronic paper; and
the notebook is displayed on the electronic paper.

9. The information processing system according to claim 1 further comprising
a playback operation receiving unit that specifies a playback position and receives a playback operation for the playback data by, wherein
the playback processing unit,
after the playback operation is received by the playback operation receiving unit, plays back the playback data from the time stamp corresponding to the playback position.

10. The information processing system according to claim 1, wherein
the playback processing unit,
generates a timer interrupt at each specific time interval during the playback of the playback data, and plays back the playback data that is acquired from the data management apparatus by the acquisition request unit and that has the time stamp corresponding to within the specific time from the time corresponding to the generated timer interrupt.

11. An information processing system comprising a plurality of mobile terminals, and a data management apparatus that is connected to the plurality of mobile terminals via a network; wherein
each of the mobile terminals comprises:
an authenticating unit that performs user authentication based on inputted authentication information;
a touch panel unit that displays a user's own page that is a page of the user's own notebook together with a page of another user that is the page of the another user's notebook;
an input receiving unit that receives writing for copying a copy target area that is selected from the another user's page via the touch panel unit to the user's own page;
an application executing unit that together with receiving writing by the input receiving unit, is capable of executing at least one application;
a recording request unit that respectively adds time stamps to the copy-and-paste data received by the input receiving unit and execution contents of each of the at least one application executed by the application executing unit, and as playback data of a written page, transmits a recording request to the data management apparatus;

an acquisition request unit that, when displaying the written page on the touch panel unit, performs an acquisition request for the playback data of the written page, and receives the playback data from the data management apparatus; and a playback processing unit that, based on the time stamps, synchronously plays back the copy-and-paste data and the execution contents included in the playback data received by the acquisition request unit;

the data management apparatus comprises:

a recording request receiving unit that receives a recording request for the playback data from the mobile terminal;

a data storage unit that stores the playback data for which a recording request has been received by the recording request receiving unit for each page of the notebook of each user; and an acquisition request responding unit that searches the data storage unit for the playback data requested to be acquired in response to an acquisition request from the mobile terminal and transmits the playback data to the mobile terminal; and the recording request receiving unit, in the case where a recording request for the copy-and-paste data that is copied from the another user's page is received, copies the playback data of the another user corresponding to the copy target area and stores the playback data in the data storage unit as playback data of user's own page.

12. The information processing system according to claim 11, wherein the input receiving unit, in the case where the copy target area is larger than a pasteable area of the user's own page, divides the copy target area and copies to a continuous plurality of the user's own pages;

the recording request unit adds a time stamps to the copy-and-past data corresponding to the copy target areas divided for each of the continuous plurality of the user's own pages, and as playback data of the user's own written page, transmits a recording request to the data management apparatus; and the recording request receiving unit receives the recording request for the playback data, copies the playback data of the another user correspond to the divided copy target area, and stores the playback data as the user's own playback data in the storage unit for each of the continuous plurality of the user's own pages.

13. The information processing system according to claim 11, wherein the recording request receiving unit, copies the another user's playback data from a first time stamp to a last time stamp corresponding to writing data inside the copy target area as the another user's playback data corresponding to the copy target area.

14. The information processing system according to claim 11, wherein the recording request receiving unit, in the case where the cop-and-paste data copied from that another user's page for which a recording request is received includes copy-and-paste data copied from a different another user, copies the playback data of the plurality of another users corresponding to the copy target area to the storage unit as playback data of the user's own page.

15. An image processing method executed by an information processing system comprising a mobile terminal and a data management apparatus that is connected to the mobile terminal via network; whereby the mobile terminal:

displays pages of a notebook on a touch panel unit;

receives writing on the page via the touch panel unit;

executes at least one application together with receiving writing;

respectively adds time stamps to received writing data and execution contents of each of the at least one executed application, and as playback data of a written page, transmits a recording request to the data management apparatus;

when displaying the written page on the touch panel unit, performs an acquisition request for the playback data of the written page, and receives the playback data from the data management apparatus; and based on the time stamps, synchronously plays back the writing data and the execution contents included in the received playback data; and the data management apparatus:

receives a recording request for the playback data from the mobile terminal;

stores the playback data for which a recording request has been received for each page of the notebook in a data storage unit; and searches the data storage unit for the playback data requested to be acquired in response to an acquisition request from the mobile terminal and transmits the playback data to the mobile terminal.

* * * * *